United States Patent [19]

Baran et al.

[11] Patent Number: 4,893,333
[45] Date of Patent: Jan. 9, 1990

[54] INTERACTIVE FACSIMILE SYSTEM AND METHOD OF INFORMATION RETRIEVAL

[76] Inventors: Paul Baran, 83 James Ave., Atherton, Calif. 94025; David F. Baran, 1324 Josephine St., Berkeley, Calif. 94703

[21] Appl. No.: 323,282

[22] Filed: Mar. 14, 1989

[51] Int. Cl.[4] .................. H04M 11/08; H04N 1/42
[52] U.S. Cl. ...................................... 379/100; 358/468
[58] Field of Search ............... 379/100; 358/400, 401, 358/402, 468

[56] References Cited

U.S. PATENT DOCUMENTS

| | | | |
|---|---|---|---|
| 4,028,733 | 6/1977 | Ulicki | 360/10 |
| 4,274,114 | 6/1981 | Kozima | 358/257 |
| 4,317,136 | 2/1982 | Keyt et al. | 358/256 |
| 4,331,983 | 5/1982 | Burton et al. | 358/257 |
| 4,532,379 | 7/1985 | Tsukioka | 179/2 R |
| 4,579,053 | 7/1988 | Satomi | 379/100 |
| 4,581,656 | 4/1986 | Wada | 379/100 X |
| 4,607,289 | 8/1986 | Kurokawa | 358/257 |
| 4,652,700 | 3/1987 | Matthews et al. | 379/89 |
| 4,672,459 | 6/1987 | Kudo | 358/257 |
| 4,706,126 | 11/1987 | Kondo | 358/257 |
| 4,734,780 | 3/1988 | Iwata et al. | 358/257 |
| 4,764,951 | 8/1988 | Kotani et al. | 379/100 |
| 4,769,719 | 9/1988 | Endo | 358/290 |

OTHER PUBLICATIONS

*Hitachi Gives "High Five" to Himail 20F*, Oct. 88, vol. 2, No. 10, p. 5, Buyers Laboratory, Facsimile Machines, Hackensack, N.J.

Murata Business Systems, Inc., Murata F-50 Documentation.

Chorus Data Systems, New Product Information, 3/21/88, *Optical Disk Document System Adds Facsimile and Electronic Mail Capabilities*.

*The Wall Street Journal*, "Wang to Introduce Innovative System For 'Keyboard Phobic' Computer Users", 11/1/88, p. B6.

*FAX Reporter*, "CAN-FAX Supercharges Canon Fax with Value-Added Powers", Buyers Laboratories, Dec. 88, vol. 2, No. 12, pp. 3–5.

International Telecom, "X. TM Response".

*Primary Examiner*—Stafford D. Schreyer
*Attorney, Agent, or Firm*—Allston L. Jones

[57] ABSTRACT

This invention allows unmodified CCITT Group 3 and 4 facsimile transceivers to interactively select and retrieve facsimile pages from a shared facsimile data base FAX serve system ("FAX server"). The remote facsimile transceiver user marks a paper selector sheet forms using a pencil or pen. The selector sheet is transmitted via the remote facsimile transmitter, preferably in a turn-around polling mode, to the FAX server unit. The FAX server unit processes the facsimile signal rapidly, interpreting the selector sheet and selecting the pages desired to be retrieved prior to the normal CCITT Recommendation T.30 timeout, which would otherwise abort the line connection. The invention allows the requested information to be returned during the same telephone call. If turn-around polling is not available, then the FAX server initiates alternative strategies culminating in an automatic callback with the information desired. The capability created allows facsimile transceivers to be used as interactive terminals for selective retrieval of text and graphics, without requiring alphanumeric keyboard interaction or the need for manual intervention.

19 Claims, 19 Drawing Sheets

FIG. 2b

SELECTOR SHEET, VERSION C

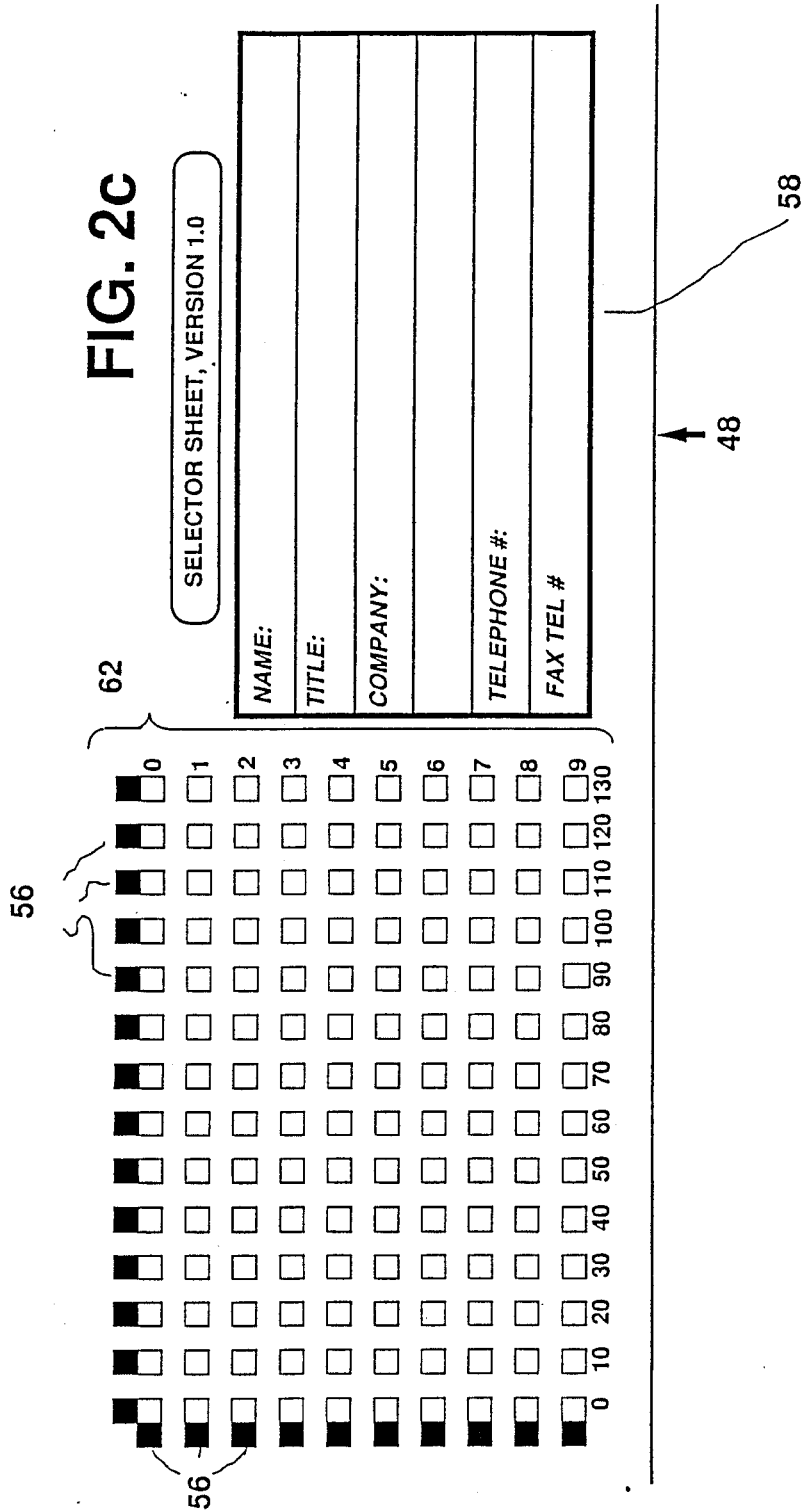

FRAME INPUT

| COMPANY: | | | | | |
|---|---|---|---|---|---|
| CONTACT NAME | | | DATE | | |
| TITLE: | | | | | |
| TELEPHONE #: | | | | | |
| FAX TEL # | | | | | |

| A<br>START LOCAT-ION ADD-RESS | B<br>INFORM-ATION-RETRIEV-AL NUMBER | C<br>NUMBER OF PAGES (INCL-UDING COVERS) |
|---|---|---|
| D<br>FIRST PASS-WORD | E<br>SECOND PASS-WORD | F<br>FUNCT-ION TO BE PER-FORMED |

F: 
0
1 ADD PAGES
2 REMOVE PAGES
3 MODIFY PAGES
4
5
6
7
8 FRONT COVER
9 REAR COVER

WOULD YOU LIKE MORE INFORMATION:
- ☐ By fax?
- ☐ By mail?
- ☐ By a sales call?

DO YOU PLAN TO PURCHASE:
- ☐ Within 3 months?
- ☐ In 3 to 6 months?
- ☐ Within a year?
- ☐ Uncertain ( ACKNOWLEDGEMENT FORM )

Thank you for the pleasure of serving you. If you mark and re-send this sheet by fax, we will provide you with additional information relative to your information request. (The three left columns of this form relate this information to your previous fax message.

Fig. 2g

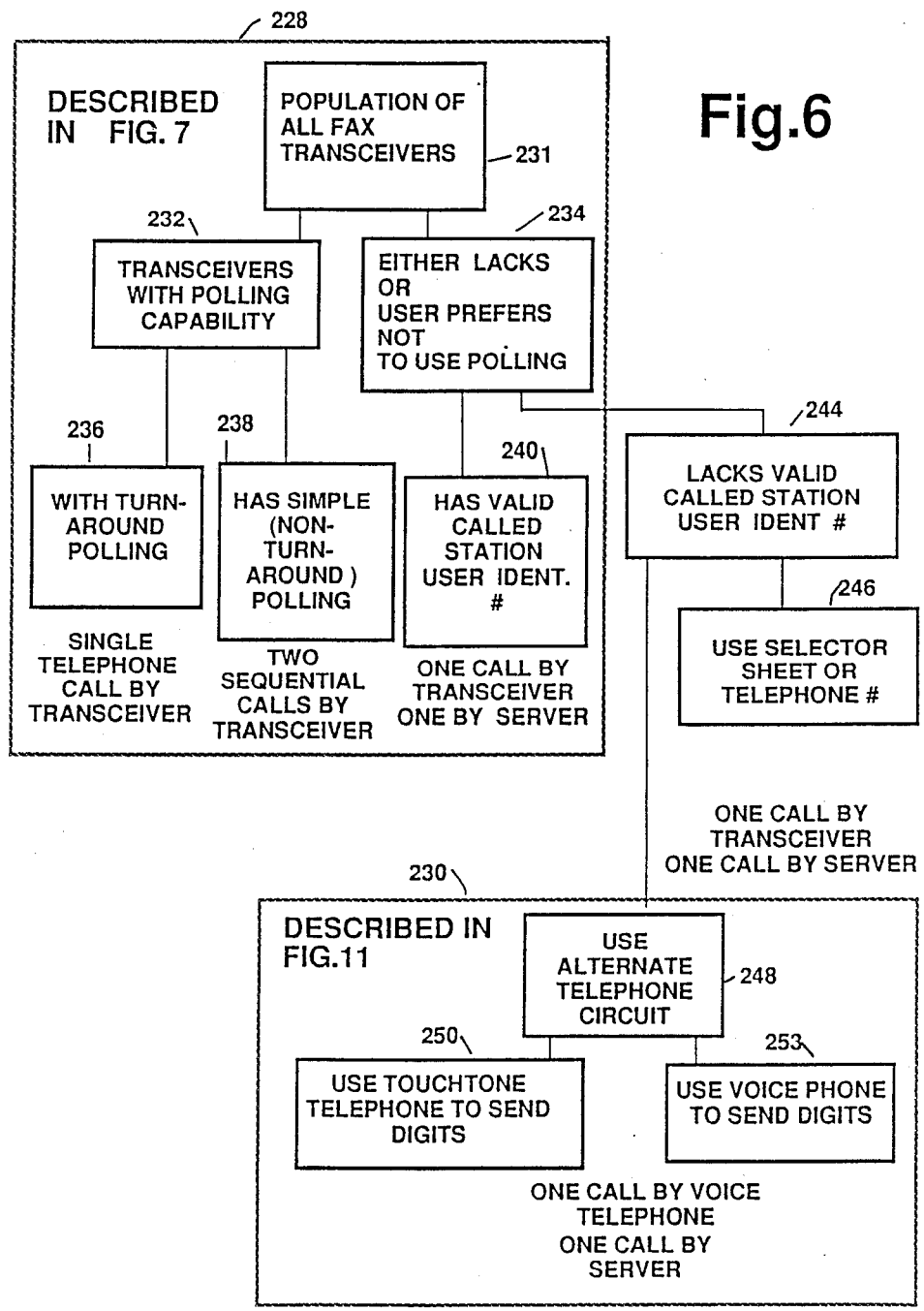

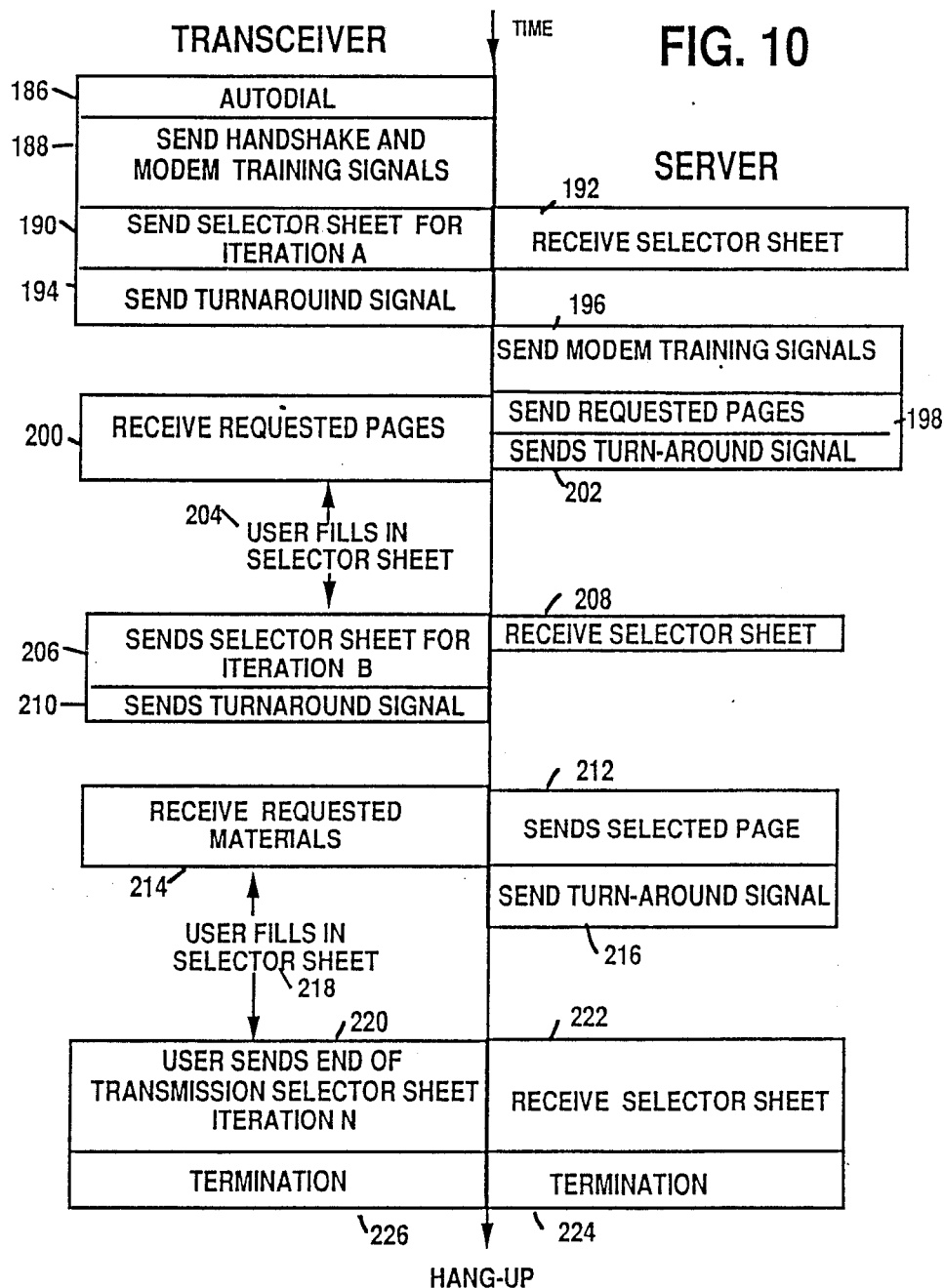

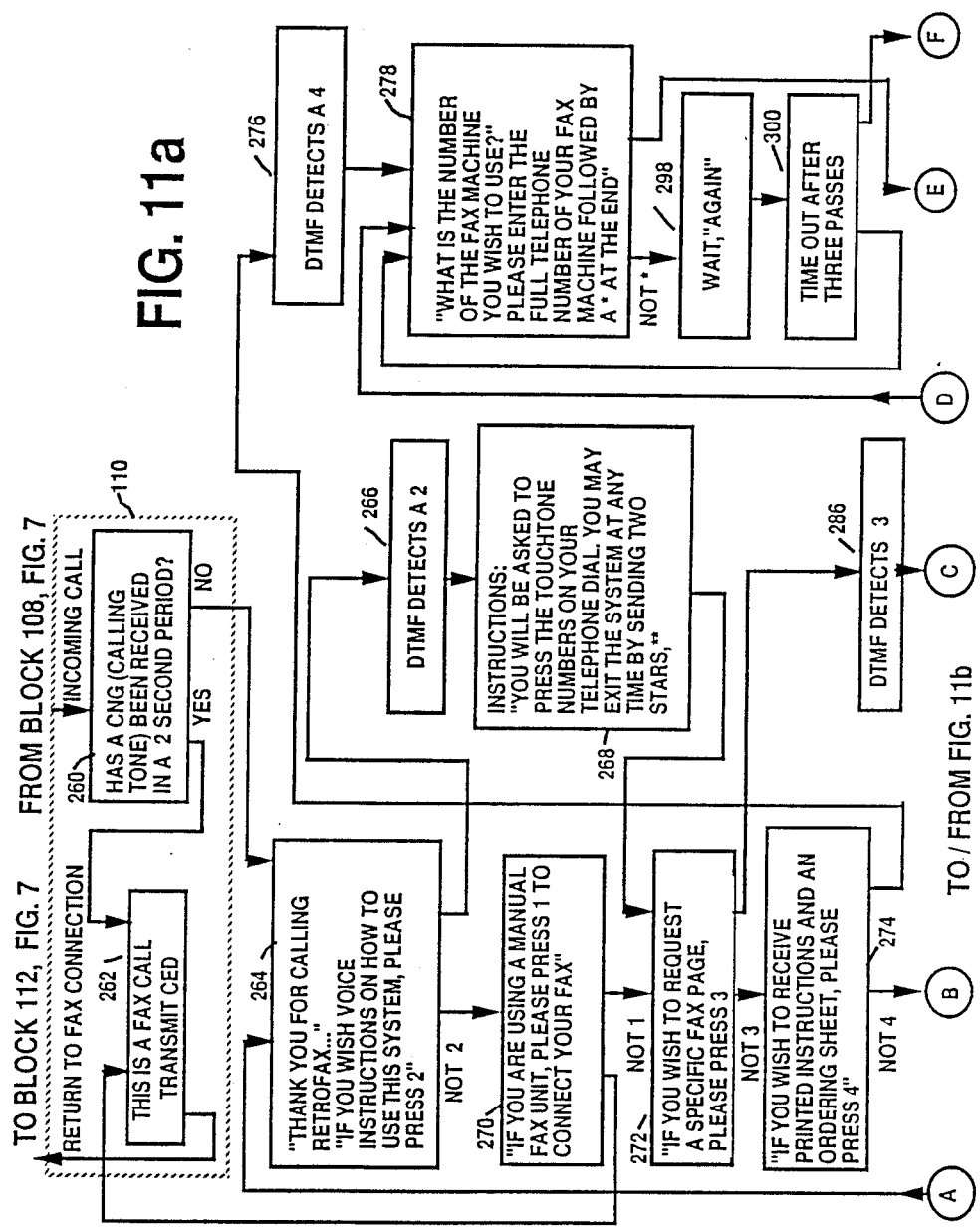

INTERACTIVE FACSIMILE SYSTEM AND METHOD OF INFORMATION RETRIEVAL

Background of the Invention

1. Field of the Invention

This invention relates to a graphic retrieval capability for existing CCITT Group 3 and 4 FAX transceivers by the use of a novel interactive shared FAX retrieval server (hereinafter referred to as "FAX server"). FAX transceivers follow a common set of CCITT international standards. Adherence to these standards and protocols allows FAX transceivers from different manufactures to effectively intercommunicate. The present invention relates to the interactive use of an unmodified FAX transceiver serving both as an inquiry terminal and as an output device for the retrieval of pages either stored or created remotely. In particular this invention provides an inquiry process that uses a pencil and paper input form to allow rapid retrieval of information and uses any existing CCITT FAX transceiver.

2. Description of the Prior Art

A FAX is often used for manual information retrieval today in business. A voice telephone call, or a facsimile request, is made to a clerk who then sends the requested pages to the caller by FAX. Sometimes trade magazine advertisements list a dedicated voice telephone number to encourage inquires where the caller is asked to supply their FAX number so that requested material can be returned by FAX. The fastest return speed currently promised in the literature is "less than one hour." Graphic information retrieval for large data bases, using a CRT display is often used in the prior art. Information is selected interactively using a full keyboard and a CRT display. When the desired information is found, a printed copy is then made. The copy is then either sent by FAX or by mail.

Perhaps the closest relevant art to the present invention is that of a FAX transceiver using passwords and operating in a polling mode. With password operation for polling, the FAX transceiver with text to be sent can be set to require, prior to reception, a pre-agreed four digit numeric "password". The four digit privacy polling key, or password, is generally entered via a keyboard on the FAX transceiver. However, as a practical matter, this is a highly constrained approach and not used in practice in this manner as a selective retrieval mechanism.

The general avoidance of highly constrained keyboard selection to facilitate system use by untrained potential users is advantageous. A pencil and paper input selection means would allow widespread access to all users. In particular, users that cannot, or prefer not to, use a computer keyboard would be provided access to such a system. By allowing a pencil, or a similar marking device, and paper retrieval selector input device, use of the system would be available even without training, to open new interactive FAX retrieval applications that would serve the broadest possible base of potential users. Since there is a large population of FAX transceivers in service today, each becomes a candidate for use as a retrieval terminal when used with the desired FAX server described above. Another improvement over the existing art that is advantageous would be the ability of the system to return information sought immediately upon request, perhaps even during the requestor's telephone call. This would allow minimization of the telephone tolls paid by the FAX server and would permit supporting applications where the user pays for the cost of delivery of the requested copies. The present invention provides such a system.

Summary of the Invention

CCITT FAX transceivers communicate with other FAX transceivers via the public switched telephone network. In the present invention, connection is made from any FAX transceiver to a remote FAX server. Via a FAX transceiver, the user transmits an appropriately filled in selector sheet. The marked areas on the selector sheet are machine read and interpreted by the reception unit of a FAX server to determine what information is being sought by the user.

In one mode of operation, this is done prior to the FAX transceiver's "time-out", so that the designated information is returned to the requestor during the user's initiated telephone call. To do so preferentially requires that the FAX transceiver contain a turn-around polling option, and that very rapid processing take place within the FAX server, immediately upon receipt of the selector sheet. In this mode, the marked areas on the selector sheet are analyzed and selection of the desired pages made and returned prior to the time-out limitation present in the CCITT T.30 Recommendation.

The invention teaches that the use of transmitted patterns relatively insensitive to positional alignment, plus proper handshaking, facilitates machine recognition of markings of an incoming selector sheet to allow the server to return the materials requested to the caller quickly. While in one mode it is assumed that the FAX transceiver has a turn-around polling feature, it is also necessary to serve all other FAX transceivers as well, including those that lack any polling capability and even those that lack calling subscriber identification—an internal telephone number identifier that can be sent during the FAX transceiver's call set up.

The FAX server of the present invention is designed to support all FAX transceivers that meet minimum CCITT standards regardless of any optional features that they lack. In the T.30 Recommendation the calling FAX transceiver "wakes up" the called FAX unit. The called FAX unit replies with a list of the internal features, or facilities, that it supports. The calling FAX transceiver then makes its decision as to feature choices. The calling FAX transceiver can be viewed as the master and the called machine as the slave.

In the present invention, intelligence is concentrated at the FAX server, while the FAX transceivers are relatively "dumb" devices. As the called FAX server does not directly learn about the capabilities of the calling FAX transceiver, this is done by inference. For example, if the calling FAX transceiver does not attempt to poll, then the FAX server of the present invention assumes that the calling FAX transceiver lacks polling capability. In the present invention, a number of different options are inferred about the calling FAX transceiver (e.g. whether the calling FAX transceiver has turn-around polling; simple polling; or no polling at all). The FAX server's response can be different in each case.

Some, but not all, FAX transceivers contain an internal telephone number identification described in CCITT Recommendation T.30 which should correspond to the international telephone number of the FAX transceiver, including country code. In practice, the U.S. country code is rarely used. Sometimes even the area code is missing. And, usually the long distance dialing prefix ("1") is also missing. In some cases that have been encountered, the wrong telephone number is found, and in others a telephone number was never entered. A FAX transceiver with turn-around polling, combined with a FAX server with rapid machine reading of the selector sheet and processing provides a sufficiently short turn-around time to permit delivery of the information sought on the same telephone call.

But if the FAX transceiver has only simple polling (i.e. it can either transmit, or receive on a single call, but not both), an alternative approach is used. If the FAX server seeks to have the user alone pay for the telephone calls, then two calls by the calling FAX transceiver are required. During the first call, the user transmits a selector sheet that designates the information requested. During the second call by the user, in the simple polling mode, the FAX server returns the material requested. There are ways that the two calls can be logically related automatically. The internal telephone number in the FAX transceiver could be used to associate the two calls received within a short time window. Alternatively, the FAX server can call back the FAX transceiver's internal telephone number. Another fallback alternative is to require FAX transceivers that lack a valid internal telephone number to put their actual telephone number onto the selector sheet. The CCITT Recommendation T.30 calls for a 20 decimal digit number corresponding to the international telephone number of the FAX transceiver to be entered into the FAX transceiver by the user at the time of installation. That telephone number must be converted into a locally usable format by the FAX server before it can be used in a call-back mode.

There is one further potential complication. Since the present invention seeks to serve all potential users, even those without prior access to a selector sheet or instructions, the FAX server of the present invention will also respond to the transmission of a blank sheet of paper in lieu of a selector sheet as a request for initial help. The response of the FAX server to a blank sheet is to send the assumed novice user a "starter kit" consisting of a selector sheet and simple instructions. Additional copies of the selector sheet can be made on an office copier. Sometimes, it will be necessary to get the starter kit to the user without relying upon the FAX transceiver's internal telephone number (i.e. the user has only a low cost FAX transceiver with minimal capabilities and lacks an internal telephone number capability).

To handle this case, the present invention uses touch-tone telephone transmission, reception and detection of the standard dual frequency tones used by telephone systems for dialing. Such telephone dialing detection is distinct from the FAX process and protocols. Another embodiment of the present invention allows the FAX server to use the same telephone number for both FAX and voice telephone inquiry. To accomplish this when an incoming call is received by the FAX server, the connection is first made to the FAX modem. If the transmission came from an automatic transmission FAX transceiver, its handshaking would start by transmitting a calling tone (CNG—this is an 1100 Hz tone transmitted with a period of 0.5 seconds on and three seconds off). If a time interval of longer than three seconds is observed without the presence of the 1100 Hz tone, the FAX server then assumes that the incoming call is either a voice call or a manually operated FAX transceiver. When a CNG tone is detected, the FAX modem is engaged. If no calling tone is detected, a DTMF (dual tone multiple frequency) detector is connected to receive touch-tone signals and a pre-recorded or digitized voice message transmits instructions to the FAX transceiver's user.

For example, these instructions advise a user of a manual transmitting FAX transceiver to press a touch-tone dial key "1". The FAX server's modem is then connected and then transmits the CED (called station identification signal, a 2100 Hz tone). If the "1" key is not pressed, it is then assumed that a voice telephone call is underway, and instructions are then provided to the user as to how to use the system. The user is then advised by a a voice message to enter their FAX transceiver's telephone number via the touch-tone keypad on their telephone. Specific pages can be recalled by this arrangement as well.

The touch-tone approach is primarily advantageous in the first iteration of an interactive series and less so in later iterations since the initial user would additionally be sent a selector sheet and instructions via their FAX transceiver. Each such selector sheet sent by the FAX server would have the telephone number of the user's FAX transceiver pre-imprinted thereon, in machine readable format. This then obviates the need for more than one touch-tone call in this manner. Most FAX transceivers come equipped with a telephone attached that could be used for this application.

A possible alternative to touch-tone dialing is the use of speaker independent voice recognition. For example Texas Instruments publication SPRN 036p. 7, Feb. 1989 describes the SRS-1 chip for speaker independent recognition of a 12 word vocabulary, adequate to recognize all digits from 0 to 9 plus two separators. One retrieval application that has been encountered requires periodic retrieval of the same page but updated in time, such as a wheather report. In that case the 20 digits reserved for the FAX transceiver number are replaced by a 10 digit telephone number and a 10 digit number describing the specific set of pages desired. The FAX server thus separates the two components to identify the information desired and the telephone number of the FAX transceiver that is to receive the information.

The above techniques in various combinations achieve information retrieval process conducted entirely without manual intervention. This in turn allows every ordinary FAX transceiver to become an interactive data terminal. The requested information is returned during the same telephone call, or during an immediately subsequent call. If desired, the major communications costs can be borne solely by the calling party to allow significant new high volume business applications to become economically viable.

Brief Description of the Drawings

FIGS. 2a–2e are pictorial representations of several selector sheets which could be used to select information to be retrieved from the FAX server of FIG. 1.

FIG. 2f is a pictorial representation of a frame input selector sheet for adding data to the stored data base of the FAX server of the present invention.

FIG. 2g is a pictorial representation of a follow-up selector sheet provided to the user as the last page in the material provided to use the present invention for advertiser follow-up.

FIG. 6 is a flow chart of the options by which the FAX server determines the "address" for all FAX transceivers found in practice.

FIG. 10 is a flow diagram that illustrations the operation of the present invention in another mode of operation.

FIGS. 11a-11b are a flow chart of the use of touch-tone/andio recognition as a method of selection and user identification.

Detailed Description of the Preferred Embodiments

Throughout the following discussion numerous abbreviations of standard facsimile terms are used. Table I provides a definition of those terms.

TABLE I

| ABBREVIATION SUMMARY | |
|---|---|
| CCITT | = Consultive Committee for International Telegraphy and Telephone |
| Server Unit Sends: | |
| CED | = Called Station Identification |
| DIS | = Digtal Identification Signal |
| Server Unit Receives: | |
| DCS | = Digital Command Signal |
| TRAINING | = Signal Used to Set Modem Parameters |
| Server Unit Sends: | |
| CFR | = Confirmation to Receive |
| DTC | = Digital Transmit Command |
| CIG | = Calling Subscriber Identification |
| CSI | = Called Subscriber Identification |

Simplified Block Diagram

Figure 1:
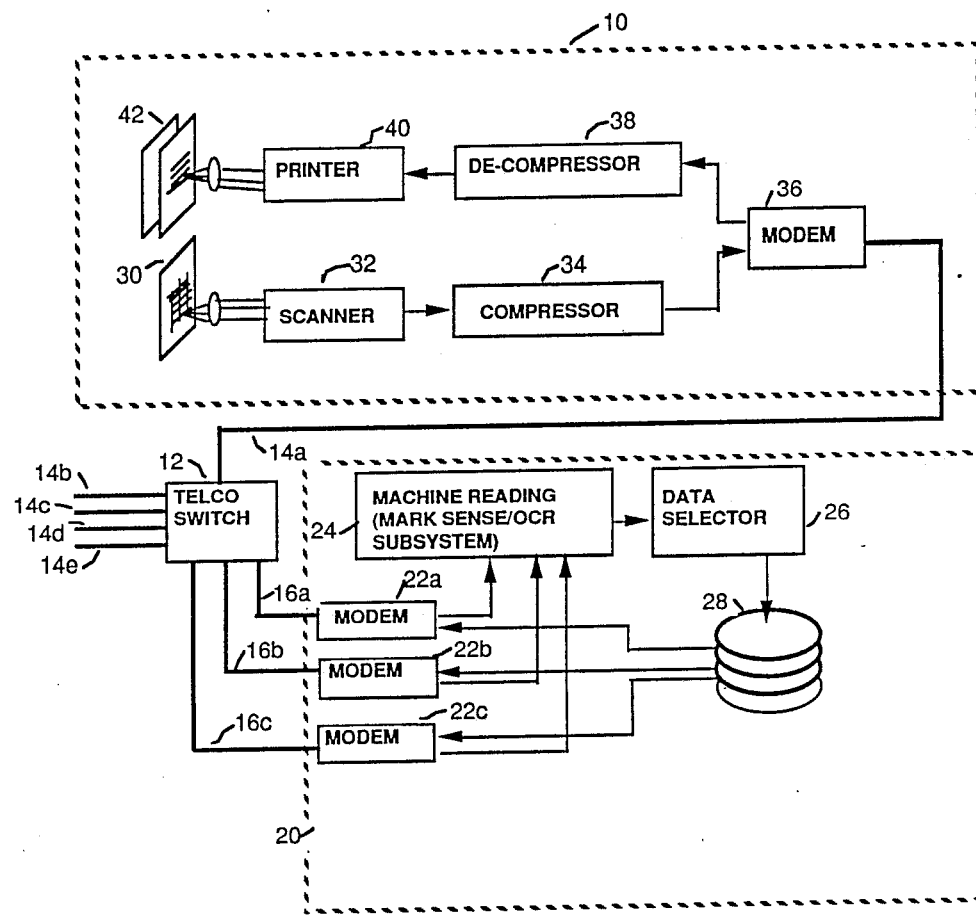
FIG. 1 is a block diagram of one of a plurality of FAX transceivers connected to a single FAX server of the present invention for information retrieval.

Referring to FIG. 1 there is shown three major blocks in an overall system block diagram: a FAX transceiver 10; a telco switch 12; and a shared FAX server 20. FAX transceiver 10 is representative of conventional FAX transceivers and is provided for the requester to request and receive copies of selected information that is prestored in a shared FAX server 20. In a multiline environment, typical of the present invention, the telco switch 12 (telephone company switching equipment) interconnects one or more FAX transceivers 10 via lines 14a-14c to a plurality of input lines 16a-16c of FAX server 20. The multiple line system is the most efficient application for the present invention, however, the concept is equally applicable to a single line system.

The typical FAX transceiver 10, as shown in FIG. 1, includes a scanner 32 for reading a document 30 and formatting the information therefrom in a graphical electronic format, pixel by pixel, line by line. The graphically formatted signal is then transferred from scanner 32 to data compressor 34 before being applied to modem 36 for transmission to telco switch 12 and server 20. Modem 36 also functions to receive a signal from server 20 via telco switch 12. The received signal is transferred from modem 36 to data decompressor 38 where the received signal is decompressed before being transferred to printer 40. Printer 40 in turn converts the electronic signal received by it to a format for printing the data encoded in the electronic signal on media 42.

FIG. 1 further shows that shared FAX server 20 includes modems 22a-22c which communicate with lines 16a-16c of telco switch 12. Internally, each of modems 22a-22c is connected to transfer the incoming signal to the machine reading (mark sense/OCR) system 24. The output signal from the machine readable system 24 is then coupled to data selector 26 where the addresses for the desired information are decoded. The decoded addresses are then coupled to disk memory 28 where the desired data has been previously stored in compressed form by known techniques. The selected data is then transferred from disk memory 28, to the appropriate modem 22a-22c from which the information was requested, for transmission to the requester via the associated line 16a-16c.

The FAX transceiver 10 optically scans each page to be transmitted, converting the input raster image into a compressed format as described in CCITT Recommendation T.4 for the Group 3 FAX transceivers, and Recommendation T.5 for the Group 4 FAX transceivers. The digital output signal modulates a CCITT V.29 modem 36, which operates at 9600/7200/4800/2400 bits per second, depending upon the line quality encountered during the call. The standard V.29 modem used in facsimile systems is a half duplex device. Signals are first sent in one direction between the facsimile transceiver and the server 20. Alternatingly, this direction of data flow is reversed to allow reception of "hand shaking", or coordinating signals, and thence image transmission in accordance with the T.30 Recommendation.

Images are sent in T.4 Recommendation compressed format, so that it is necessary to expand the image into a full raster for printing at the FAX transceiver 10. The FAX server 20 is shown interfacing with a bank of V.29 modems 22a-22c to simultaneously support multiple FAX transceivers 10. However, only a single modem is required for single line operation. (In the case of Group 4 machines, this termination could occur at 64 Kilobit/sec or other speeds.) A shared machine reading system 24 operates upon the received signals, senses the markings on a selector sheet electronically from a bit map of the selector sheet, and interprets the user markings on each selector sheet page (discussed more completely below). The value of these markings are translated into data commands to determine the locations of the stored data to be retrieved and sent to the calling FAX transceiver 10. In the interest of data storage economy, this information is preserved in compressed format, and need not be expanded at the time of transmission.

Selector Sheets

Figure 2A:
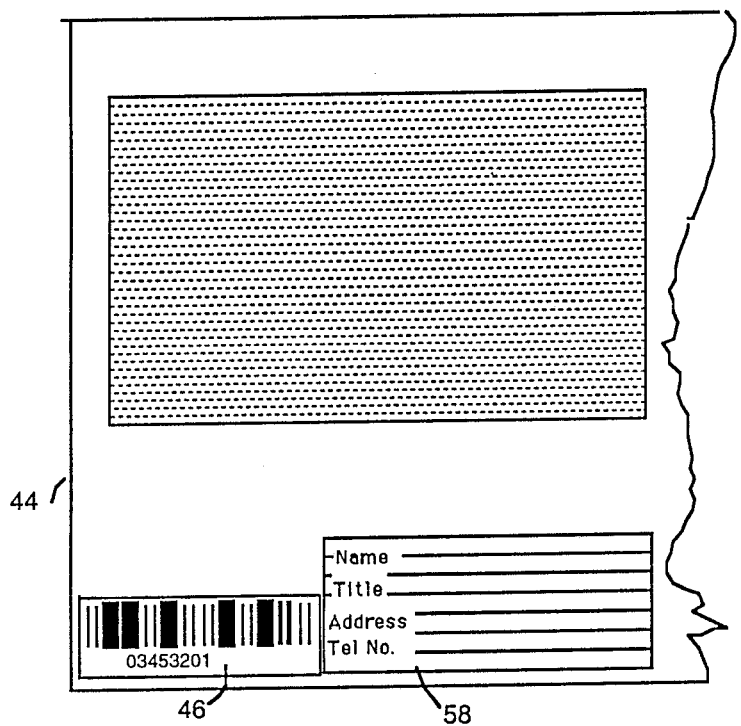

FIGS. 2a-2e show examples of selector sheet formats that may be used in various versions of the present invention. FIG. 2a shows a sample advertisement 44 from a trade magazine with an information retrieval number encoded in a bar code 46 which is printed therewith. Additionally, space 58 is provided for the requestor to enter a name and address for the advertiser to follow-up, if they so choose. Each of FIGS. 2b–2e shows a different selector sheet format each containing a number of fields. Those fields may be marked by pencil, pen or similar marking devices.

If a reader wishes to obtain more information on a product advertised in a trade magazine wherein the advertisement 44 includes the information retrieval number encoded in the form of a bar code 46 as in FIG. 2a, the reader simply removes the advertisement, or advertisements, of interest, completes the name and address fields 58 below the bar code 46, calls the information retrieval number provided in the magazine, and transmits at least the bar code portions of each of the advertisements of interest via a FAX transceiver 10. FAX server 20 then decodes the bar codes and transmits a copy of the information stored in memory 28 to the reader's FAX transceiver 10. In lieu of a bar code, it is possible to mechanically read and recognize an entire advertisement to indicate the information desired without the necessity of a bar code label.

Figure 2B:
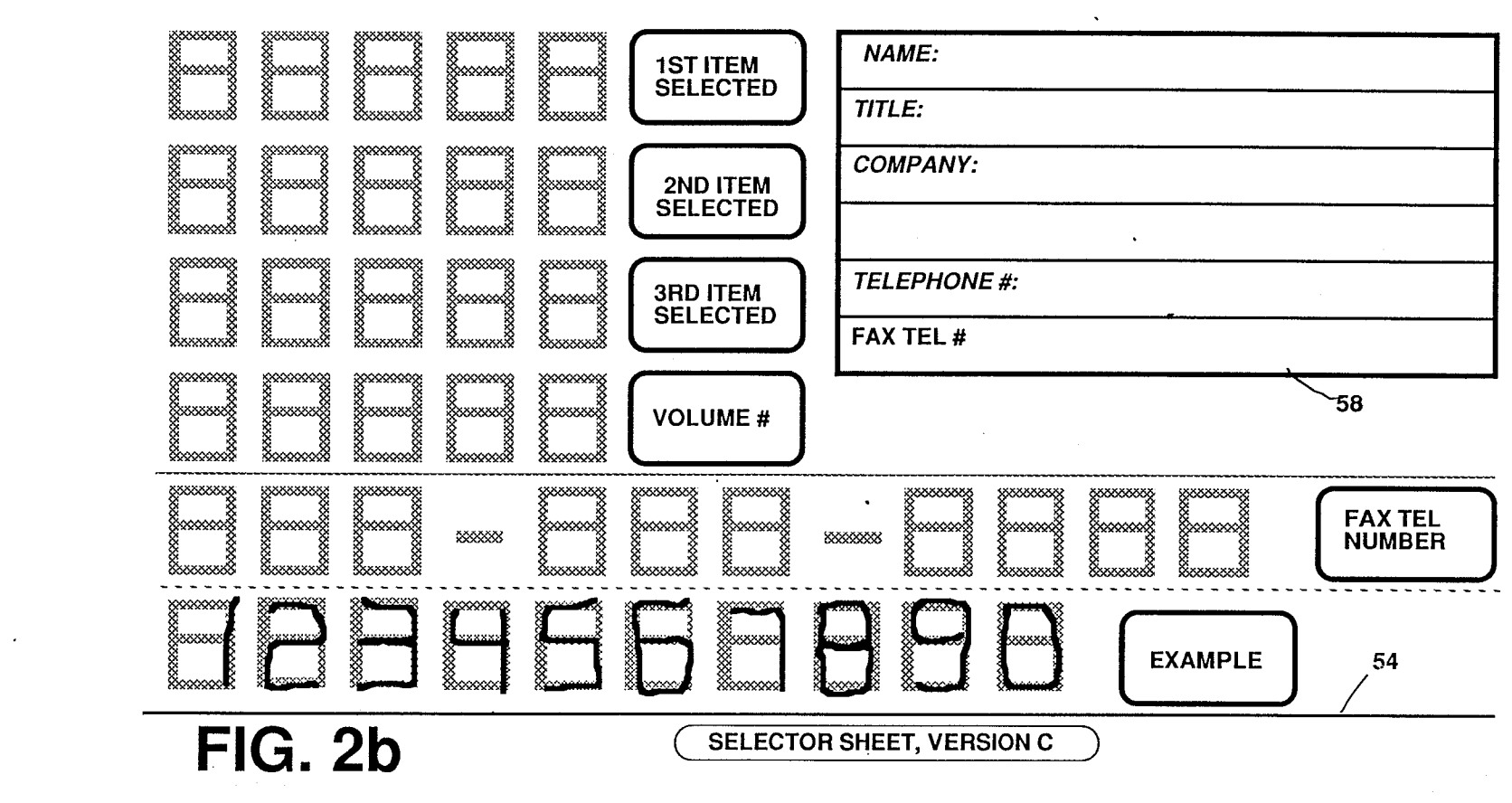

In FIG. 2b selector sheet 54 allows abbreviated requests for products advertised in trade magazines, prenumbered governmental forms, etc. The reader fills in an address field 58 and marks by hand printed characters up to three retrieval numbers of products, or forms, of interest, and the telephone number of the requestor's FAX transceiver if it lacks turn-around polling. These numbers can be reliably interpreted by FAX server 20, provided the characters are constrained to follow the back ground pattern guide printed as shown on selector sheet 54.

Figure 2D:
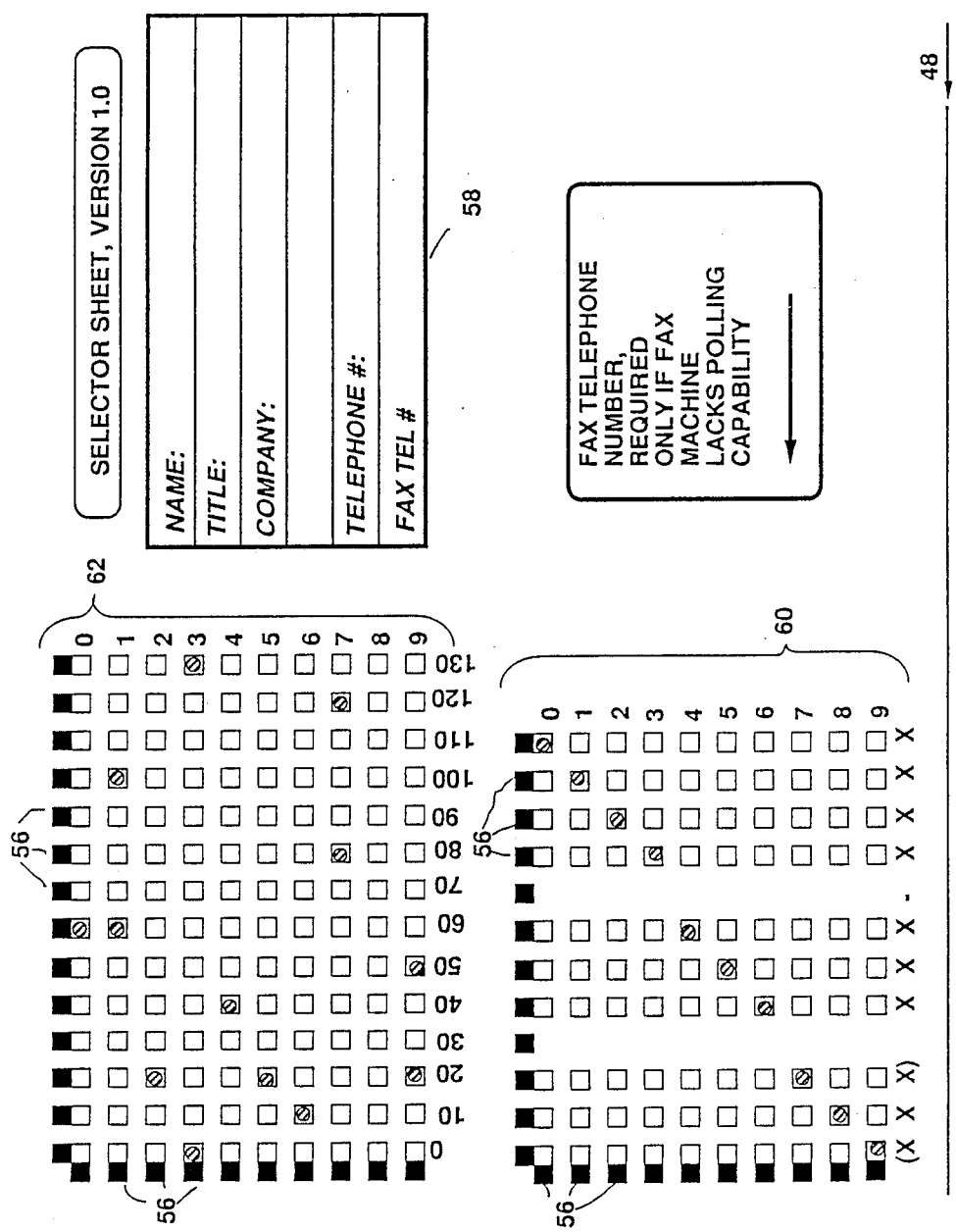
Figure 2E:
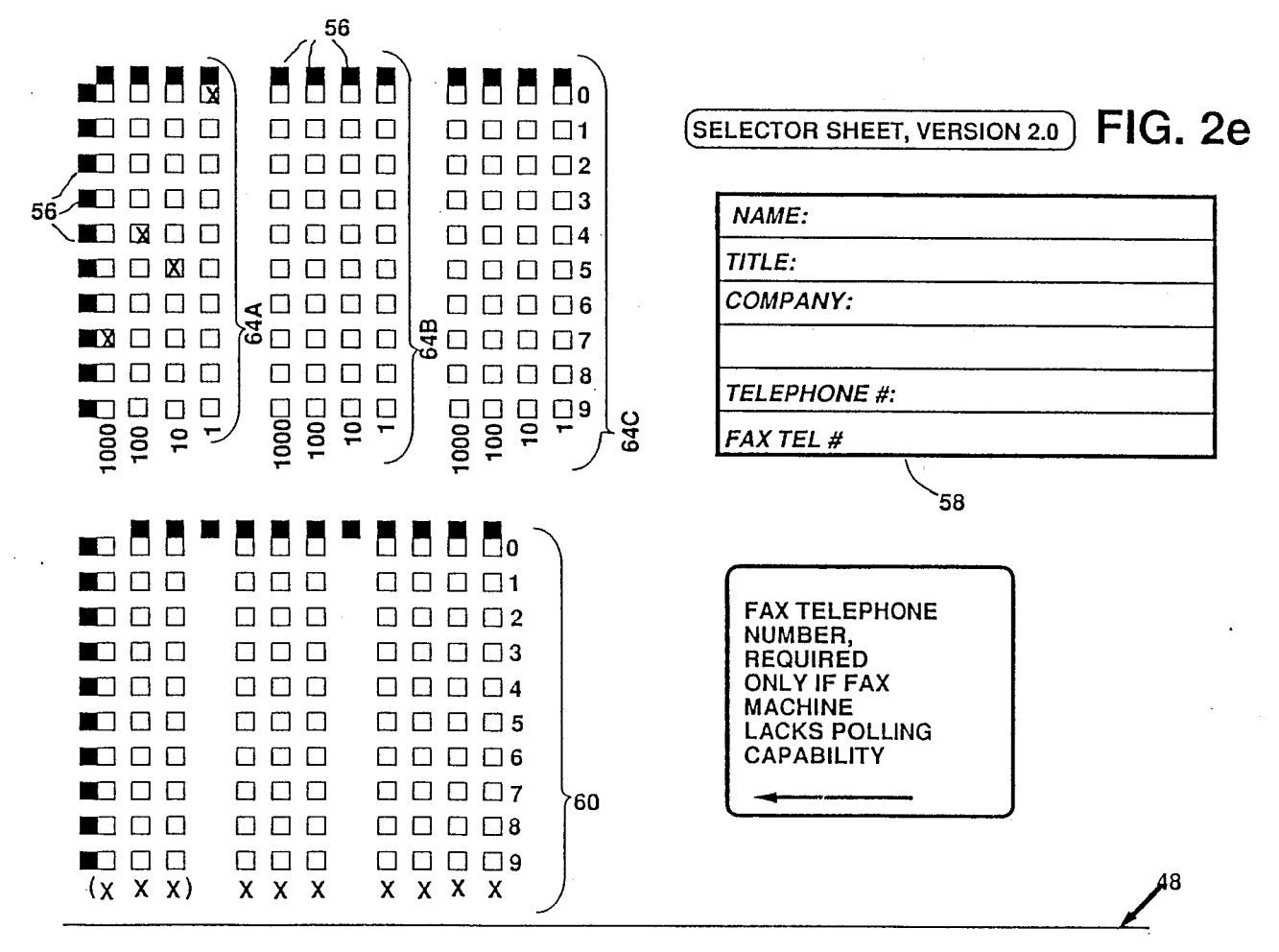

Recognition of the markings by FAX server 20 must be done with an occasional expectation of poorly formed markings. In FIG. 2c–2e, marking blocks with a series of fiduciary position indicators 56 are used to provide some immunity to errors that might otherwise be caused by minor skewing of the selector sheet or by minor size changes of the array when users duplicate the selector sheets on office copiers.

Other machine readable arrangements, such as those using Fourier Transformation character recognition schemes, to avoid position dependence can also be used. The only constraint is the efficacy of the machine reading character recognition algorithms for poorly formed and transmitted indicia. The interactive nature of the process allows correction of errors by informing the caller that the input was ambiguous or unreadable.

The selector sheets illustrated in FIGS. 2c and 2d are electronic versions of the "bingo" postal cards 48, bound into magazines. These cards 48 allow abbreviated requests for products advertised in the magazines with the only difference between them being the addition of field 60 in FIG. 2d for the optional inclusion of the sender's FAX number when turn-around polling is not a feature of the sender's FAX transceiver. To use either of the cards of FIGS. 2c and 2d, the reader fills in address field 58, shades in the squares 62 on the card corresponding to the retrieval numbers found in the product advertisements of interest, and optionally shades in squares 60 for the sender's FAX transceiver number. The card is then transmitted as discussed above in relation to FIG. 2a. To enter the telephone number, one square in each column in the appropriate row is to be filled in. In FIG. 2d the number 987/654-3210 is entered by way of example. Similarly, field 62 is for the entry of a plurality of "bingo" numbers, as shown in FIGS. 2c and 2d the numbers 0–139 may be selected from. By way of example, the numbers 3, 16, 22, 25, 44, 59, 60, 61, 87, 101, 127 and 133 have been selected in FIG. 2d.

Referring next to FIG. 2e there is shown another selector sheet format. This selector sheet includes three fields: the name and address field 58, and the optional FAX transceiver telephone number field 60 (both of which were discussed above), and field 64 for the entry of a plurality of selected retrieval numerals. Field 64 is shown as having three sub-fields, 64a–64c. Each of the sub-fields is capable of displaying a number from 0–9999. By way of example, sub-field 64a is encoded with the numeral 7,451.

FIG. 2f shows a representative cover sheet to be used by the owner, or an advertiser, to add/remove/modify information to or in the data base stored on disk 28 of FAX server 20 by means of a FAX transceiver. The form includes three fields. Field 67 is for the manual entry of information to identify the advertiser. Field 68 is an informational field to identify the information needed to be entered into each of sub-fields 66a–66f. Sub-fields 66a–66e are completed as was described above for sub-fields 66a–66c of FIG. 2e. In sub-field 66a the starting address in the memory of disk 28 where the data is, or is to be, stored is entered. Sub-field 66b is where the information retrieval number (bingo number) of that information is entered. Sub-field 66c is for the entry of a page count of the number of pages that are included, or to be included, in the memory for that retrieval number. The number to be entered in sub-field 66d is a password number for access to read any pages already stored at the selected address location, and the number to be entered in sub-field 66e is a second password number that will allow the user to read into and write out of the selected memory address. Finally, sub-field 66f is provided to select the function that the user wishes to perform: to add, remove or modify pages to, from or in the memory; or to designate a page as a front or back cover page.

Once the input form of FIG. 2f is completed, it is placed on top of the pages to be added to, or modified in, the data base, the stack of pages are transmitted via a FAX transceiver 10 to FAX server 20. If pages are to be removed, then the form of FIG. 2f is transmitted, as above, alone. The machine reading system 24 then reads the form and decodes the passwords to see if they correspond to those of the memory address specified on the form. If the passwords and the address are in agreement, then the function selected in sub-field 66f is performed.

FIG. 2g shows a representative follow-up form that FAX server 20 might be programmed to provide to the user at the end of the transmission of data pages via FAX transceiver 10. FAX server 20, stores in memory 28 each user's FAX transceiver telephone number and assigns a transaction number when the user makes an initial request for information. That transaction number is coded into the three columns of field 70 by FAX server 20. If the requestor wishes to have a representative of the advertiser follow-up on the inquiry, the user would complete the appropriate blocks of field 71 and retransmit the form of FIG. 2g to FAX server 20. FAX server 20 will then store that request in memory 28 together with the user's earlier supplied address and telephone number data from field 58 of the selector sheet originally used by the user. FAX server 20 is able to make that association by means of the transaction number in field 70 and by matching the FAX number identification provided with the transmission of the form of FIG. 2g with the FAX identification number previously stored with the field 58 data. This request for additional information is then available for later printout, or recall, by the advertiser.

Other response card formats may require the user to place check marks in a series of small printed boxes corresponding to answers to questions. Where the potential population of items to be selected from is large, and where the number of items desired on a single call is small, the blocks can be organized to allow the marking of multi digit numbers. For example, a data base of 10,000,000 entries would require only 7×10 or 70 blocks per item to be retrieved.

In FIGS. 2a–2f an address title block 58 is shown on the selector sheet. With postal mail return systems such address title blocks are, of course, mandatory. In the present invention there are situations where selector sheets may be used that do not require the use of an address field, since the calling FAX transceiver 10, in accordance with CCITT Recommendation T.30, transmits a calling station identification number. This exchanged information tag by general practice corresponds to the telephone number of the calling party's FAX transceiver 10. In such cases the CSI can be used as the return address. Thus, there are applications encountered in the use of FAX server 20 where no address field is used, since that information is in effect built into the facsimile transmission process, by virtue of the Recommendation T.30 requirement. In practice some minimum cost FAX transceivers lack provision for an internal telephone number. Some FAX transceivers have never been programmed with the correct telephone number, or any telephone number at all. Also, rather than using the international telephone number in accordance with the T.30 Recommendation, only the local number or the area code plus the local number is found in practice in the U.S. To be able to call back, it has been found that it is necessary for FAX server 20 to modify the CSID. For example, this would include adding a "1" for out of area code calls, and stripping off the prefixes for local area code calls. Additional changes are necessary for international use, which includes the addition of the international access code and the country code.

User Operation

Figure 3:
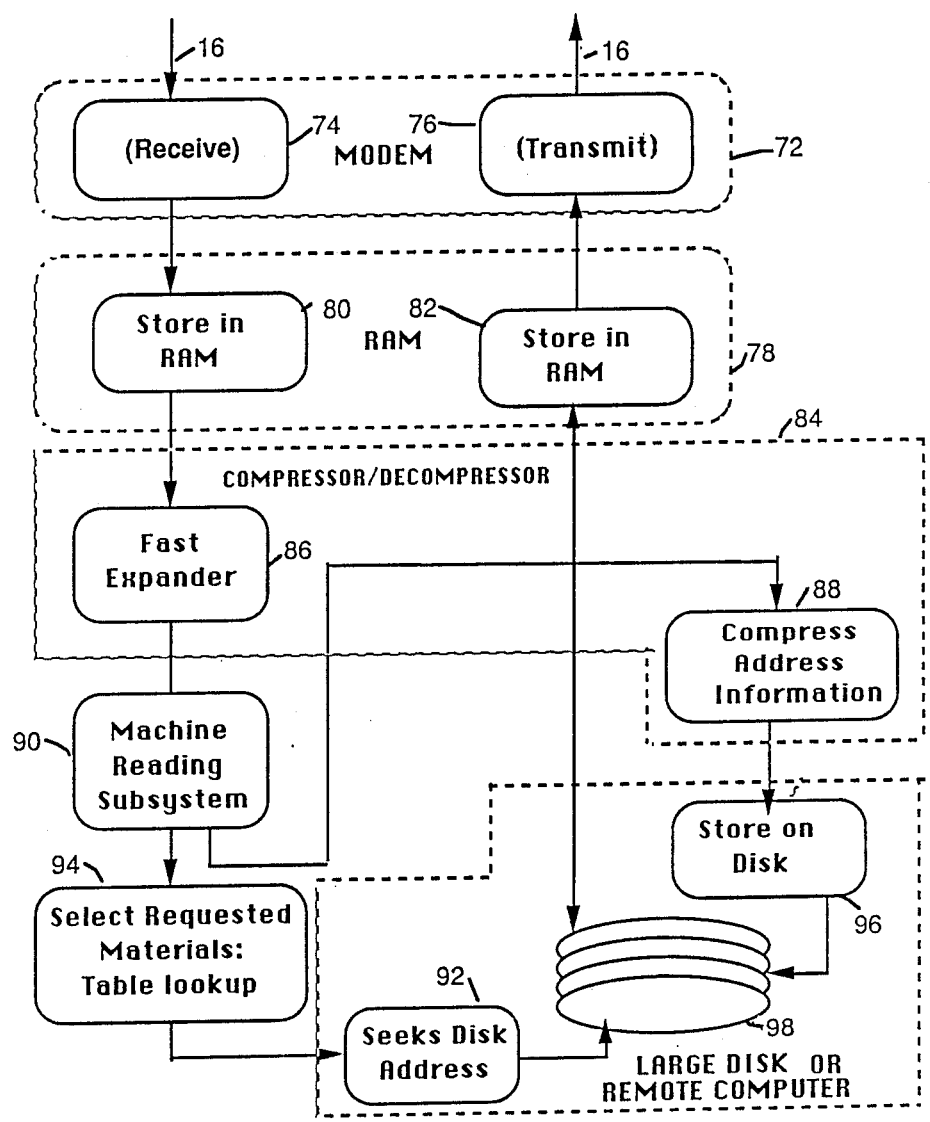
FIG. 3 is a simplified flow chart of the process of retrieving pages of information from the system of the present invention.

FIG. 3 is an operational flow diagram of FAX server 20 of the present invention as viewed by the user of FAX transceiver 10. The incoming compressed data is received by receiver 74 of modem 72 from telephone line 16. The data is then stored (block 80) in a RAM 78. RAM 78 is then interrogated by compressor/de-compressor 84 where a fast expander 86 is used to decompress the data transmitted by the user. The electronic bit map of the user entered selector sheet is then electronically passed to the machine reading subsystem 90 where the retrieval numbers entered in a constrained form or in shaded squares, or other machine readable formats, are decoded electronically and passed to block 94 where a table look-up function is performed to convert the retrieval number to an address in memory where the requested data is stored. The address is then applied to block 92 to seek the address location on disk 98. Interpreter 90 also transfers the written name and address information from field 58 to address information compressor 88 before that information is stored on disk 98 for later retrieval for follow-up by the advertiser. The requested pages are then read from disk 98 and passed to RAM 78 (block 82) in compressed form for transmission to the user (block 76) by modem 72.

While a local memory unit 98 is described, a remote data base could be used as well. In some cases where the pages to be transmitted contain very recent information, a remote computer is interrogated and the latest information used to form the page is transmitted upon request. Thus this system may also serve as an output device for a large distributed computer rather than a fixed sized memory as may inadvertently be suggested by this simplified explanation of the system.

If the user has only the telephone number of the shared FAX server 20 and no selector sheet at the outset, FAX server 20 would use a mode wherein a selector sheet is provided on the first telephone call. In that mode the known telephone number of FAX server 20 would be dialed by the user and the user would send a blank page to FAX server 20. During transmission of this page, the user would, in the preferred operating mode of the present invention, enable the turn-around polling function of the user's FAX transceiver 10.

The FAX server 20 receives and analyzes the incoming image. If the incoming page cannot be interpreted as a valid marked selector sheet, then a blank selector sheet is immediately returned to the FAX user on the same telephone call. Thus the system effectively bootstraps itself to provide the missing selector sheet. Once a copy of the selector sheet is in hand, the user may make as many additional copies of the selector sheet using an office copier as desired. When the selector sheet is properly filled in and transmitted, the requested pages will be quickly returned during the same telephone call if the user's FAX transceiver has turn-around polling capabilities.

The machine reading system 24 of FIG. 1 contains hardware and software to perform the functions of blocks 80–90 of FIG. 3. Similarly, data selector 26 of FIG. 1 performs the functions of blocks 92 and 94 of FIG. 3.

Address Field Processing

The selector sheet contains a field for the mailing and telephone addresses of the information requestor. This field can be filled in by pencil, pen, or typewriter. The state of the art of optical character recognition is not adequate at this date for accurate reliable conversion of unconstrained handwriting. Thus FAX server 20 retains the address field as a separate facsimile based image. The area occupied by the label field is relatively small. Thus, this image may be stored and transmitted at relatively low cost, combined with the digital data derived from the constrained numbers in the bingo fields. As an example, a copy of an information request for a product could be sent by FAX to the local sales department. This transmission might consist of a FAX image of the address field plus the interpreted bingo fields.

Machine Reading Interpretation

Figure 4:
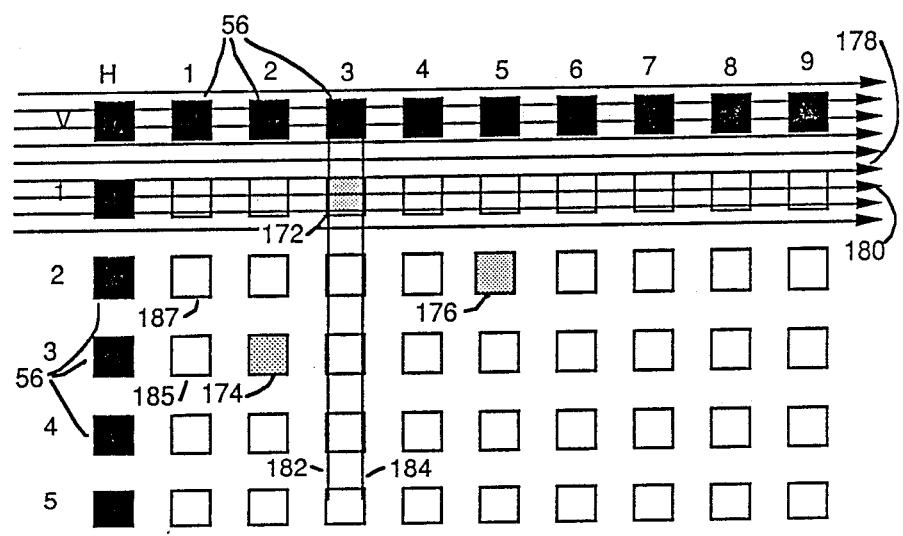
FIG. 4 is a graphical representation of the functioning of an example of a machine readable interpretation of a user entered selector sheet.

FIG. 4 graphically illustrates the electronic reading of a user entered selector sheet by the general machine readable system 24 (FIG. 1) and the machine reading subsystem 90 (FIG. 3). In neither instance is the selector sheet recreated in a hard print-out for reading by the mark sense unit 24 or 90. Each operates electronically on the user entered selector sheet in the form of a decompressed bit map.

The procedure illustrated in FIG. 4 is for a selector sheet such as those shown in FIGS. 2c–2g where there are fiduciary position indicators 56 which identify the rows and columns of the regions where the user is to enter the retrieval number (s) of interest. The intersection of the columns and rows defined by indicators 56 identify blank squares which the user shades in where the square corresponds with the retrieval number of interest. Indicators 56 are used so that the mark sense interpretation can first locate the portion of the received document that includes machine readable information. This is necessary to make adjustments for the selector sheet being feed at an angle, or if the machine readable portion is located other than at a specific location on the page.

For purposes of illustration, the fiduciary position indicators 56 oriented horizontally across the top of FIG. 4 are labelled "H", "1", "2", etc., and those oriented vertically down the left edge of FIG. 4 are labelled "V", "1", "2", etc. At the intersection of each of the numbered horizontal and vertical columns defined by the corresponding indicators 56 is a blank square 185. In this example, three of those squares, 172–176, have been shaded to illustrate the shading of such squares by a user. In normal operation a FAX transceiver 10 scans the user inputted document a single pixel line at a time with each square of a selector sheet being six to eight pixels in height and twelve to sixteen pixels in width. Since the FAX transceiver begins its scanning in the upper left corner of the document being transmitted, FAX server 20 assumes that the first pixel, or scan, lines in the decompressed bit map are from the top of the document transmitted with the scanning having been conducted from left to right, top to bottom.

Machine reading units 24 and 90 are programed to first identify the horizontal row of fiduciary position indicators 56 by sensing the occurrence of a plurality of approximately equally spaced pixel bursts each containing an approximately equal number of pixels in each burst in substantial alignment with similar bursts in a plurality of contiguous pixel lines. From this information the vertical limits for the squares that have been potentially filed by the user are defined (e.g. left and right edges 182 an 184 of horizontal indicator 56 labeled "3"). As scanning progresses, the vertical indicator 56 that has been numbered "1" is detected in the same way that the horizontal indicators 56 have been identified yielding the upper horizontal limit 178 to the first row of squares that could have been completed by the user prior to transmitting the selector sheet. As scanning continues to the right, in this example, the shaded square 172 is encountered by each scan line that defines the vertical indicator 56 numbered "1". The mark sense software identifies this square by checking its location against the vertical limits that were earlier identified while continuing to look for the lower horizontal limit 180 of the vertical indicator 56 in this row. Subsequent rows are similarly checked. Thus, given the vertical and horizontal limits on each of the user filed squares, the software can identify the retrieval number entered by the user via the selector sheet. Other techniques could be similarly used instead of the fiduciary position indicator technique discussed above. A confined location approach as discussed in relation to FIG. 2b, or bar code scanning as discussed in relation to FIG. 2a could be used.

Figure 5:
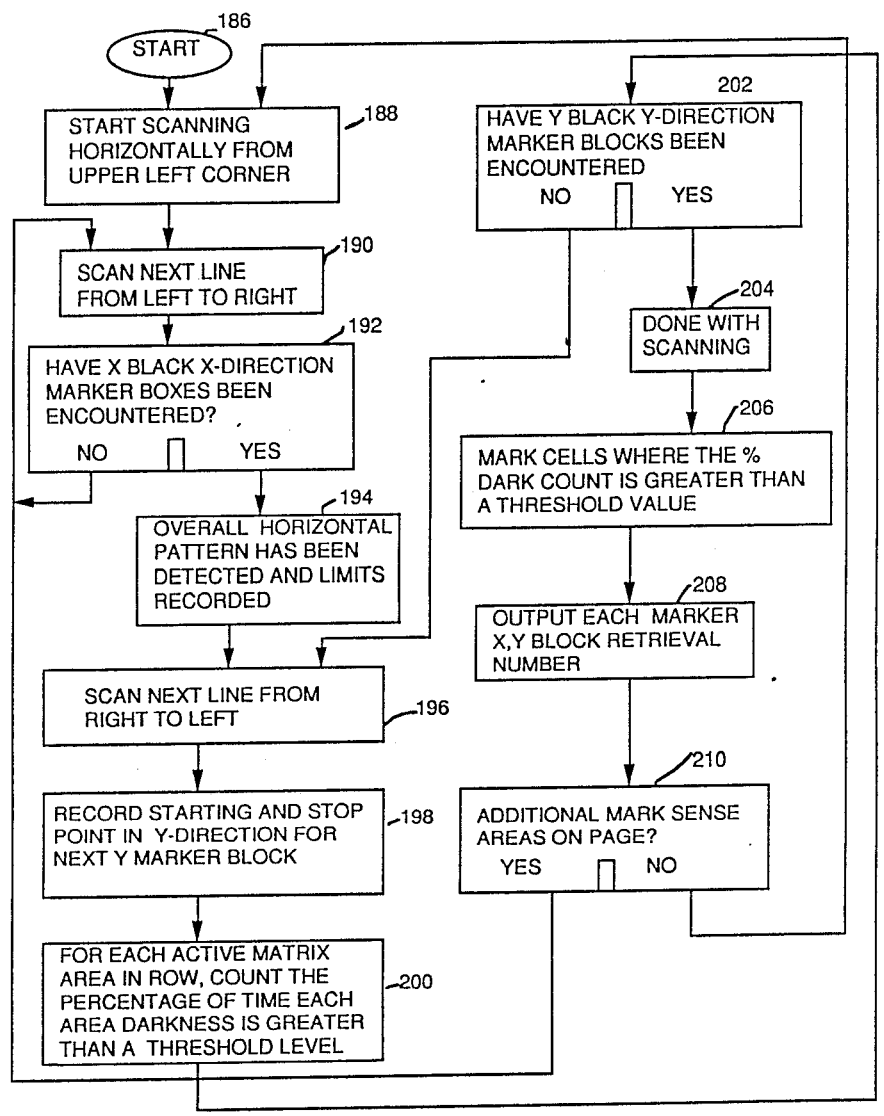
FIG. 5 is a flow chart of an example of a machine readable interpretation of a selector sheet of FIG. 4.

FIG. 5 is a flow chart of the machine reading procedure for identifying the user selected retrieval numbers as discussed in relation to FIG. 4. In FIG. 5 the procedure begins at START block 186. The scanning of the bit map is started in the upper left corner of the document and proceeds from left to right (block 188) followed by the scanning of the next line from right to left (block 190). The consecutive line scanning continues until the upper and lower limits of the X, or horizontal, fiduciary position indicators 56 are identified (block 192). Blocks 190 and 192 are cycled through repeatedly until the lower limits of the horizontal fiduciary position indicators 56 are identified. The right and left limits of each of the horizontal fiduciary position indicator 56 are then recoreded (block 194). Scanning continues at block 196 until the top limit of the next Y fiduciary position indicator 56 is identified and it's position recorded at block 198. Next the darkness level of each active matrix area is compared to a threshold level line by line (block 200). The consecutive line scanning continues until the upper and lower limits of all of the Y, or vertical, fiduciary position indicators 56 are identified (block 202). If all of the Y blocks have not been identified, flow returns to block 196 for the continuation of the process through blocks 196–200. When the scanning is complete (block 204), flow proceeds to block 206 where each of the active matrix areas defined by these X and Y limits where a user may have filled in the square are checked to see if the pixel density within each of those areas is greater than a threshold density level (block 206). If the threshold level is exceeded, the block is read as having been so marked and the corresponding retrieval number for each such square is outputted to data selector 26. Next, block 210 tests to determine if there are additional mark sense areas on the same page. If there are flow returns to block 190 to decode those areas, if there are no additional mark sense areas on the page then flow is returned to block 188 to begin the reading of the next mark sense card.

Other types of input selector sheets either with constrained fields, or other electronically identifiable information fields could be read directly from the bit map data in a similar fashion. The actual form of machine reading used is not germane to this invention and the above description is intended primarily for explanatory purposes. Machine reading is a widely known operation with numerous known techniques for performing this operation.

Polling Options

Figure 7A:
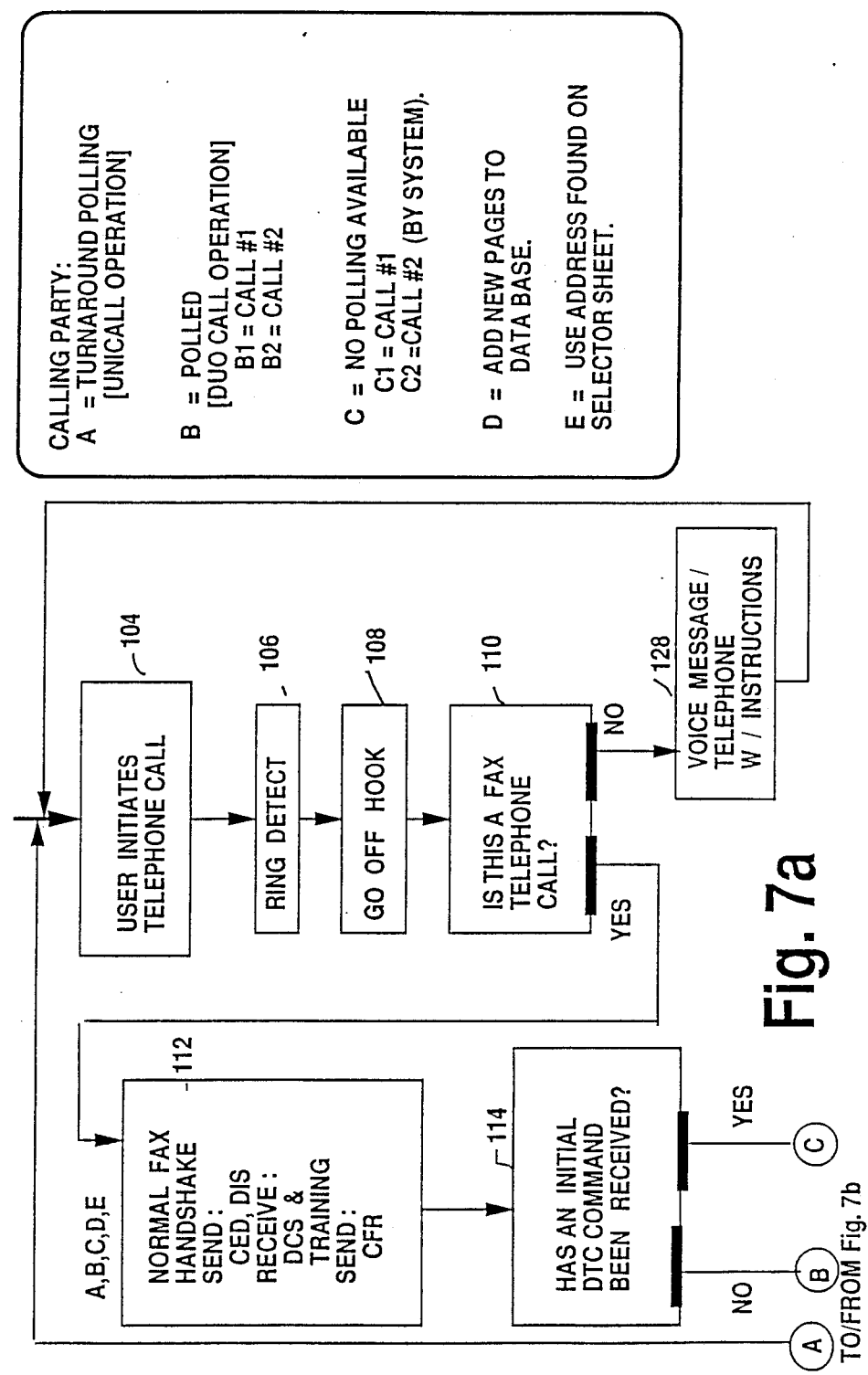
FIGS. 7a-7b is a flow chart showing the process to determine and respond to the different FAX transceivers as a subset of FIG. 6.
Figure 7B:
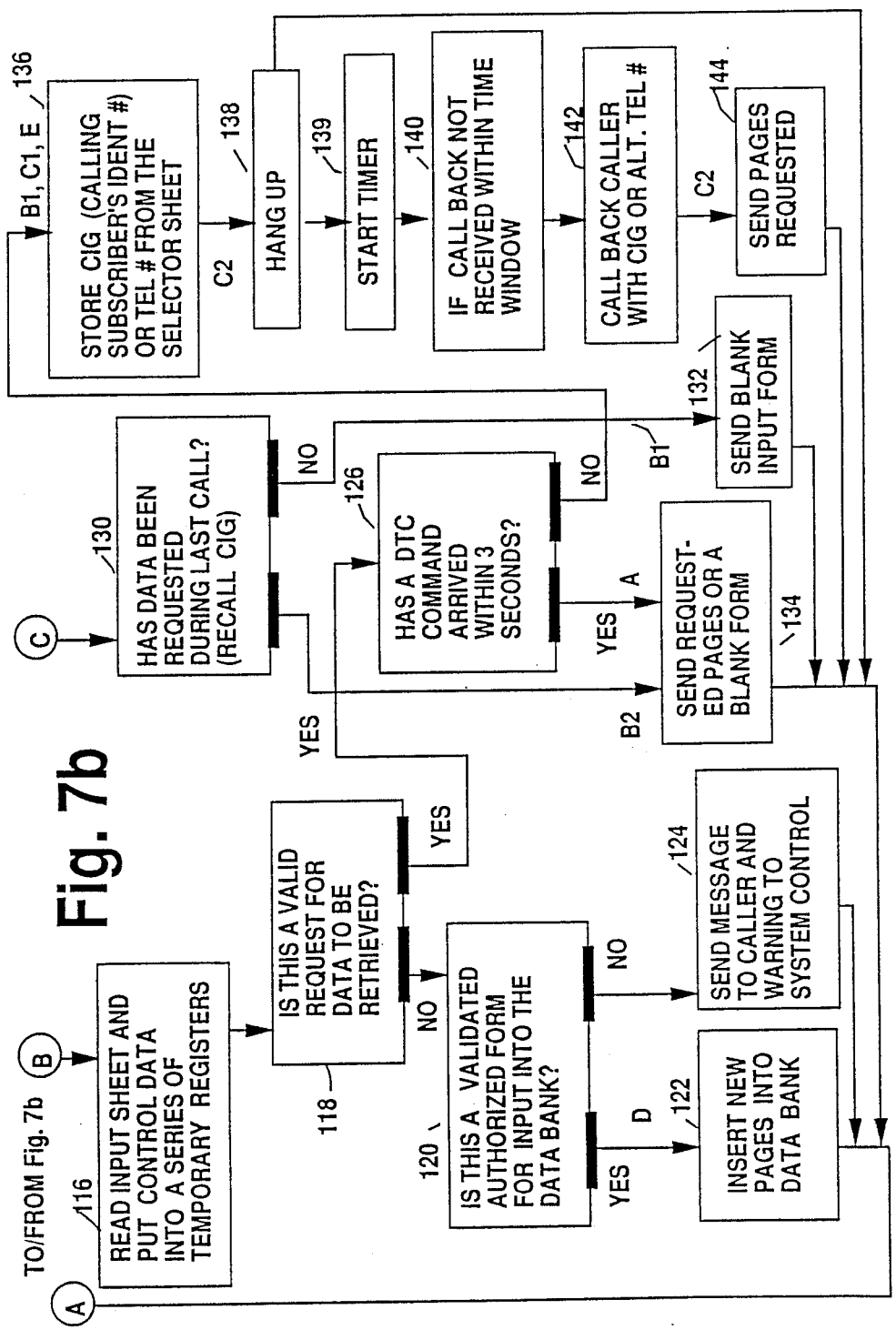

FIG. 6 is an options chart showing the system alternatives for serving FAX transceivers 10 with different capabilities. The options, or decision, tree presents the different approaches used by the present invention to cope with each of the various FAX transceiver configurations currently in use. The detailed flow charts of FIGS. 7a, 7b and 11 describe the data flow within the blocks of FIG. 6 in detail. Those in FIGS. 7a and 7b, are shown here within a dotted-outline identified as 228, and those of FIG. 4 are shown within a dotted-outline identified as 230. The block 238 is representative of the entire population of all FAX transceivers and is divided into those FAX transceivers having a polling capability (block 232) and those without (block 234). The next level considers turn-around polling (block 236). Here only a single telephone call placed via FAX transceiver 10 is required for complete operation. However, where FAX transceiver 10 has simple (non-turnaround) polling (block 238) then two sequential calls are required by the calling FAX transceiver as shown. The case where FAX transceiver 10 lacks polling or the user prefers not to use polling (block 234) is divided into two cases. The first case includes FAX transceivers that have a valid calling station user identification number (block 240), while the second case includes those FAX transceivers that either lack a calling subscriber user identification number, or holds an incorrect number (block 244). In the later case a selector sheet can be used to transmit the telephone number (block 246). This again requires two telephone calls. The first is a call by FAX transceiver 10 to the FAX server 20. The second call is a reverse call placed by the FAX server 20 to transmit the information requested. Another response to the situation where the user lacks a valid calling subscriber number (block 244) is an alternative telephone path (block 248). A touch-tone telephone dial transmitting dual tone multiple frequency signals (block 250) can be used or voice recognition of digits can accomplish the same objective (block 252). In both of these cases, one call is made via a voice telephone together with a return call by FAX server 20.

Detailed Flow Chart

The detailed flow chart of FIGS. 7a and 7b considers a number of cases marked A, B, C, D and E which are described in a block in the upper right hand corner. In each of the above-identified cases, the first four blocks of FIG. 7a are always traversed.

All calls to FAX server 20 are initiated by a user (block 104), the ring is detected (block 106), the FAX server 20 goes off hook (block 108), and the telephone line is monitored to determine if the call is a voice call or a modem to modem call (block 110). The process of determining whether the incoming call is a non-FAX call is described in detail in FIG. 11, as is the processing of a voice or touch-tone call or manual FAX transceiver. The handshaking process that is the heart of the process is described briefly in block 112 and in detail below. In the following the arrows represent the direction of the signals listed.

TABLE II

Normal: Calling Unit Sending to the Called Unit

| Calling | Called |
|---|---|
| CNG→ | |
| CNG is an audible tone which the calling unit sends to indicate that it is an automated unit. This tone is 1100 Hz that is alternately on for 0.5 seconds then off for 3 seconds. The primary purpose of this signal is to indicate to a human that a FAX machine is calling - in the case of a FAX machine which is on an extension of a PBX. | |
| | ←CED |
| When the called station answers the phone, it sends this signal back. This tone is 2100 Hz, and lasts for between 2.6 and 4.0 seconds. The called unit then delays for about 75 milliseconds before continuing. | |
| | ←DIS |
| The DIS (Digital identification signal) consists of three basic parts. The first part signals the desired data rate, how wide the recording width can be, how long the pages can be, etc. | |
| The second part of DIS is the called subscriber identification (CSI). It is OPTIONAL, and is the international telephone number of the called subscriber. This field allows only digits and the space character. | |
| The third part is the non-standard facilities field (NSF). It, too, is an optional field. | |
| DCS→ | |
| (Sent if the calling unit wishes to transmit) This is called "command to receive." The calling unit commands the answering unit to receive. | |
| TSI→(optional)→ | |
| Following DCS, the calling unit may also send TSI | |

TABLE II-continued

Normal: Calling Unit Sending to the Called Unit

| Calling | Called |
|---|---|
| which indicates that the following information is the identification of the transmitting station. TSI is supposed to be the international telephone number including telephone country code, area code, and subscriber number. It is encoded the same way as the CSI and allows only digits and the space character. | |
| NSS→(optional)→ | |
| Following the optional TSI, the called unit may also send an optional NSS field which is a command to the other end as to how to use the nonstandard facilities that were expressed in the NSF field earlier. | |
| TCF→ | |
| Following the optional NSS field, the calling unit sends the digital command TCF which is all zeros for 1.5 seconds. It indicates that training has begun. | |
| | ←CFR |
| The confirmation to receive signal (CFR) indicates the pre-message procedure has been completed and that message transmisson may begin. | |
| If training was not successful (in the viewpoint of the called unit), it sends failure to train (FTT) back which causes training to begin again. | |
| message→ | |
| The calling FAX machine then transmits the message. | |
| → | |
| Post-message response, one of the following: | |
| [1] EOP (end of procedure): this was the last page, | |
| [2] MPS (multipage signal): there are more pages, which will be sent assuming a positive response to this signal, | |
| [3] EOM (end of message): this was the last page of this message, but that we want to do something else. This is the way that turnaround polling is done. Following acknowledgment of this signal, communications picks up back at the DIS stage. | |

TABLE III

How Regular Polling Works

| Calling | Called |
|---|---|
| CNG→ | |
| | ←CED |
| | ←DIS |
| CIG→ | |
| This is the calling station identification. It is encoded the same as the CSI and TSI. | |
| DTC→ | |
| This is called the Digital Transmit Command - it commands the receiver to transmit. | |
| NSS→ | |
| This signal is the command response to the information contained in the NSF field. | |
| | ←DCS |
| This is the response to the DTC command. It commands the calling unit to receive. From this point forward, everything is just like the regular transmission diagrammed above, only with the arrows reversed. | |

TABLE IV

How Turnaround Polling Works

There are two halves to turnaround polling. During the first half, the calling machine transmits a page to the called unit. During the second half, the called unit transmits back to the calling unit. At the end of the first half (i.e. after the page has been sent from the calling to the called unit), the calling unit sends an EOM message. The called unit then responds with MCF (message confirmation). Following message confirmation, it goes back and begins at the CSI stage (i.e. it acts just like it answered the telephone again). The calling unit is smart enough to know that it's doing the second half of turnaround polling and it sends the normal signals to do polling.

Thus, turnaround polling really isn't anything more than a slightly different behavior that occurs between the machines in response to the EOM signal.

It is through the handshake function that the parameters of the intertransmission between the FAX transceiver 10 is established and FAX server 20 is informed whether transceiver 10 has polling capabilities. If FAX transceiver 10 has turn-around polling, then there will not be a transmission of a DTC command immediately (block 114) and flow will be transferred to block 116. At block 116 the input sheet is read and tested to see if it is a valid request for information block 118). If the input sheet is a blank sheet or an approved data selector sheet for use with the installation, flow continues to block 126 to determine if the DTC command has been received in the allotted time. If FAX transceiver 10 has turn-around polling, that signal will have been received and control will be transferred to block 134 where the user's request is processed and the requested information is transmitted to the user. If the user transmitted a completed selector sheet then the information sent will be the selected information, however, if the user transmitted a blank sheet to FAX server 20 will send the user a selector sheet for use in selecting the desired information during a subsequent call.

If the user's transceiver 10 has either simple polling or no polling and has made the first telephone call to request information, the data flow is blocks 104–118 and 126 as for the turn-around polling situation. The difference is that the DTC command will not have been received at block 114 or at block 126 within the allotted time. Thus flow continues from block 126 to block 136 where FAX server 20 records the user's transceiver's telephone number either from the transmitted CIG signal, or by reading the number from the appropriate field on the selector sheet transmitted by the user. Next, FAX server 20 hangs up (block 138), starts a timer (block 139) and control returns to block 104.

If the user's transceiver 10 has simple polling and the user calls FAX server 20 back within the time limit of the timer (block 139), FAX transceiver 10 will transmit a DTC command to FAX server 20 (block 114) and FAX server 20 will compare the CIG or telephone number of FAX transceiver 10 with those stored in the previous time period (block 130). If the comparison is true and the user requested data during the previous call, flow shifts to block 134 where the user is sent the requested pages. If the user transmitted a blank page during the pervious transmission then flow continues to block 132 to provide the user with a blank selector sheet.

If the user's transceiver 10 does not have polling, or if the user did not call back within the time provided (block 140) by the timer (block 139), FAX server 20 will call the user's transceiver 10 using the stored CIG or telephone number (block 142). When the connection is made, FAX server 20 will send only a minimum number of pages of those requested by the user or a blank selector sheet if the user transmitted a blank page during the first call (block 144).

Next, if the user has the appropriate passwords to allow them to alter some or all of the data stored in FAX server 20, that can be done remotely by transmitting a data change selector sheet to FAX server 20. In this way the user can add to, or delete from, the data stored in the memory of FAX server 20. The flow for this operation begins with blocks 104–118. At block 118 the data change selector sheet is recognized as not a valid request for data and flow is directed to block 120 where the input form is tested to determine if it is a valid form for altering the data stored in FAX server 20. If it is, the user is allowed to alter the stored data as desired (block 122). However, if the user was somehow able to get to block 120 without the appropriate authorized form to change the stored data (e.g. incorrect password) flow is directed to block 124 where the user is warned and the system operator is advised as to the unauthorized attempt to alter the data stored in FAX server 20.

Hardware Implementation

Figure 8:
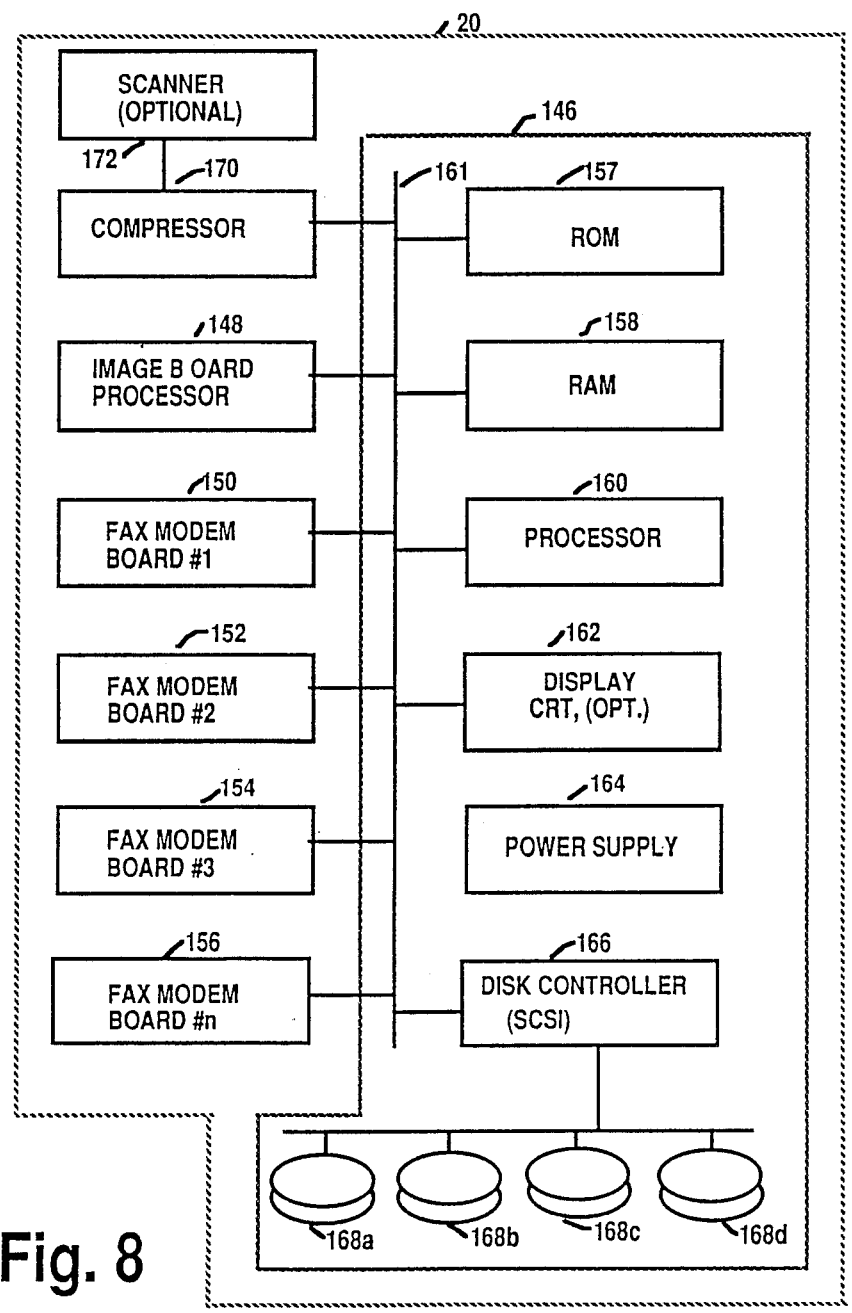
FIG. 8 is a block diagram of a physical configuration of the hardware units comprising the server of the present invention.

FIG. 8 is a block diagram of an implementation of FAX server 20 of the present invention. This implementation includes a micro-processor 160 connected via bus 161 to a ROM 157, a RAM 158, a disk controller 166, an image processor board 148, and FAX modems 150–156. Also included is a plurality of hard disks and their associated drive mechanisms 168a–168d which interface with disk controller 166. Optionally, FAX server 20 may include a CRT display 162 and a data compressor 170 each connected to data bus 161, and a scanner 172 which interfaces with data compressor 170. Also shown is a power supply 164 to provide electrical power to each component of the system outlined above. A typical implementation would be by means of an IBM AT personal computer which is shown enclosed by line 146 with each of the components shown being either standard elements of such a computer or off the shelf items that are interfaced to computer 146 via the bus 161.

In comparison, the elements of FIG. 8 correspond by function with the elements of FIG. 1 as follows: disks 168a–168d to disk 28; disk controller 166 to data selector 26; processor 160, RAM 158, ROM 157 and the related software to machine reading system 24, and modems 150–156 to modems 22a–22c.

NSF Interactive Mode

Figure 9A:
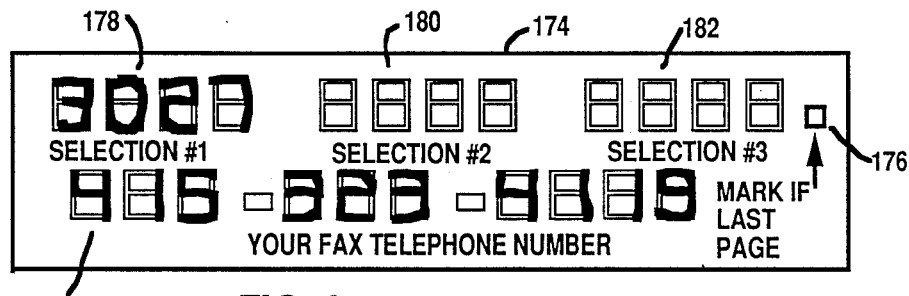
FIGS. 9a-9c show a series of shortened selector sheets for use with the present invention.
Figure 9B:
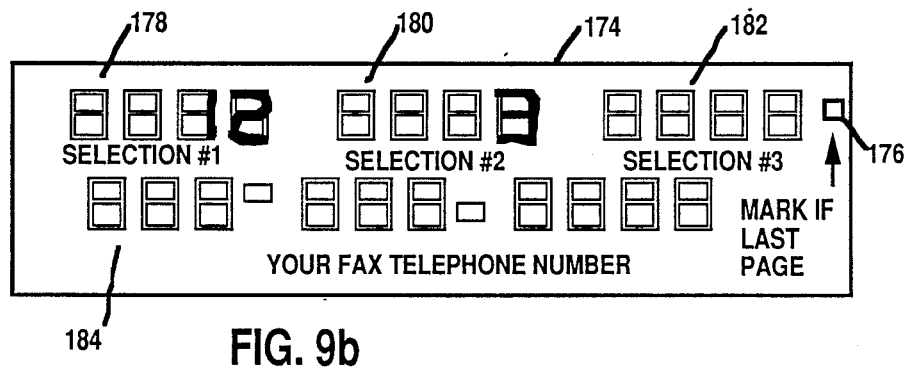
Figure 9C:
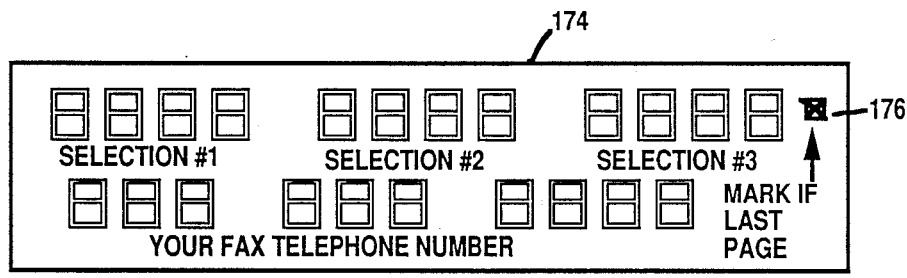

FIGS. 9a–9c show another format for a selector sheet 174 for use with the present invention in any of its modes of operation, however, this shortened form is necessary, for the mode of operation discussed below with respect to FIG. 10. Selector sheet 174 contains four constrained data fields 178–184 and a last page indicator box 176. Fields 178–182 are each for entry of up to a four digit data retrieval number, and field 182 is provided for the optional inclusion of the the telephone number of the user's transceiver 10. As discussed above, when polling is used and FAX transceiver 10 sends a CSI signal, it is not necessary to include a number in field 184. Block 176 is included for indicating the last sheet being transmitted in the mode of operation discussed below in respect to FIG. 10.

For transceivers that have the NSF (Non Standard Facilities) capability of CCITT T.30 and turn-around polling, it is possible to make the FAX transceiver 10/FAX server 20 combination truly interactive. The NSF mode allows turn-around between FAX transceiver 10 and FAX server 20 without waiting for the normal time out period to expire. This process is further accelerated by using a short form of the selector sheet similar to the on shown in FIG. 9a. To save even more time, the training between FAX transceiver 10 and FAX server 20 is overlapped with the image interpretation functions. After modem training has occurred in each direction, it can be avoided for each interactive reversal by recalling the modem parameters for the last transmission.

This arrangement in essence keeps the channel open allowing the system user to mark the next selector sheet. If the selector sheet has an end of transmission block 176 which can be marked to indicate the end of transmission, that can reduce the telephone connect time. Without an indication of the end of transmission, a long time-out period, on the order of a minute or two, is needed to terminate the transmission. The above discussion assumes that a CCITT V.29 half duplex modem is used for the facsimile transmission. If a full duplex modem is used the operation can be further overlapped.

In FIG. 10 a time/function flow chart is shown for the operation of transceiver 10 and FAX server 20 when the shortened selector sheet and the NSF function of transceiver 10 is utilized to make this an interactive data transfer system. Initially the user instructs FAX transceiver 10 to dial FAX server 20 (block 186) which is immediately followed by the handshake and training signals (block 188). The user next transmits a first shortened selector sheet like that of FIG. 9a (block 190), which is received by FAX server 20 (block 192) at substantially the same time. The sample selector sheet of FIG. 9a shows the user requesting information that is associated with retrieval number 3027 and has provided the transceiver telephone number even though that is optional when polling exists between FAX transceiver 10 and FAX server 20. Following the transmission of the first selector sheet, transceiver 10 immediately sends the turn-around signal (block 194), then the modem of FAX server 20 sends the necessary training signals (block 196) to keep the two units interconnected. FAX server 20 then sends the user the pages that correspond to the data retrieval number selected by the user. Those pages are received by the user (block 200) and FAX server 20 sends the turn-around signal (block 202). Since the NSF mode is being utilized, the user has up to a minute or so to complete the next selector sheet (block 204). The user then transmits the next completed selector sheet 176 (block 206) which is received by FAX server 20 (block 208). Immediately after sending the second selector sheet, transceiver 10 sends the turn-around signal (block 210). Server FAX 20 then sends the requested data (block 212), as above, the data is received by the user (block 214), and FAX server 20 again sends the turn-around signal (block 216). This procedure continues until the user sends a selector sheet 174 on which box 176, the last page indicator, is checked (block 220). FAX server 20 receives that sheet (block 222), and both FAX transceiver 10 and FAX server 20 then terminate the transmission (blocks 224 and 226). As a result of the NSF function many of the various steps of the interaction between FAX transceiver 10 and FAX server 20 occur at substantially the same time as illustrated in FIG. 10.

Figure 11B:
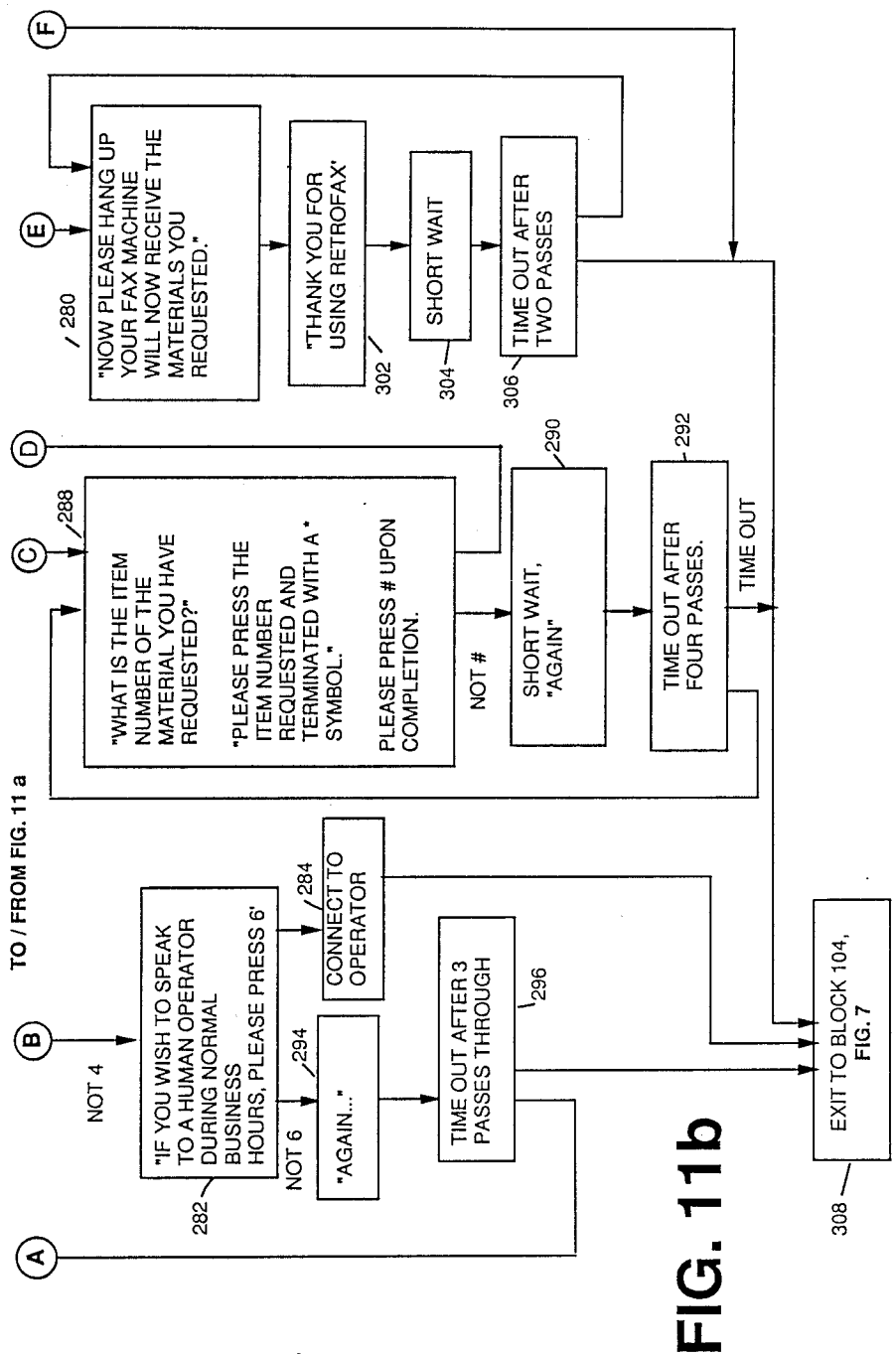

FIGS. 11a–11b are a detailed flow chart of the process of separating FAX signals from voice/DTMF signalling instructions. Reference is made to block 110 of FIG. 7a, which is shown in further detail in blocks 260 and 262. An examination is made whether a calling tone has been received from block 108 of FIG. 7a within a three second period (block 260). If so, then it is assumed to be a signal from an automatic send FAX transceiver. An acknowledging CED signal is then sent (block 262) to block 112 of FIG. 7a. Otherwise, the incoming call is assumed to be a voice or manual FAX call (block 264).

A voice announcement inquires whether voice instructions are desired (block 264). If so, key 2 on a touch-tone telephone is pressed, in response, by the user. A DTMF detector (block 266) detects this request, and this is followed by voice instructions (block 268) before continuing to block 272. If the user did not press key 2 when passing through block 264 to ask for instructions, the user is then asked in block 270 whether he or she is using a manual FAX transceiver, if so the use is instructed to press key 1. Upon doing so a CED is transmitted and detected at block 262. Otherwise control moves to block 272 where the user is asked if they wish to receive a specific page or pages via FAX transceiver 10.

If key 3 is depressed the DTMF detector detects the request (block 286) and the user is asked to enter the item number of the item desired (block 288). If the requested number is misentered or not followed by the appropriate end symbol, the user is given three more tries to enter the number (blocks 290 and 292) before exiting the subroutine (block 308). If an appropriate number is entered at block 288, control proceeds to block 278. The portion of the operation from this point forward is discussed below.

If key 3 is not depressed the user is asked in block 274 whether printed instructions are desired, and, if so, a selector sheet is delivered upon pressing key 4. Upon detection of the key 4 signal DFMF signal in block 276, a request to ascertain the caller's telephone number is then made (block 278).

At block 278 the user is asked to enter the telephone number of their FAX transceiver. The user is given a total of three attempts to do so (blocks 298 and 300) and upon failing to do so the subroutine is exited (block 308). If the telephone number is entered, then control proceeds to block 280.

The user is next instructed to hang up and to await the transmission of the requested materials (blocks 280, 302, 304 and 306). If the user fails to hang up the telephone after being instructed twice to do so (block 306) control passes to block 308.

If at block 274 the user did not enter a "4" an opportunity is presented to call a human operator during normal business hours (block 282) by pressing key 6, at which time a voice connection is made to the operator (block 284). If a "6" is not entered in response to block 282, control transfers to block 296 where the user is given three chances to make one of the selections from blocks 264, 270, 272, 274 and 282. If the user fails to make one of those selections during any of those allotted tries, control proceeds to EXIT (block 308), as it does upon completion of the voice call at block 284.

While this invention has been described in terms of several modes of operation, it is contemplated that persons reading the preceding descriptions and studying the drawings will realize various alterations and modifications. It is therefore intended that the following appended claims be interpreted as including all such alterations and modifications as fall within the true spirit and scope of the present invention.

What is claimed is:

1. A FAX server apparatus for interactively providing requested portions of stored information to an inquiring CCITT FAX transceiver by means of a machine readable information selector sheet marked by the requesting party and transmitted by the inquiring FAX transceiver to the FAX server via telephone lines, said FAX server comprising:

CCITT modem means for communicating with said CCITT FAX transceiver to electronically receive said transmitted selector sheet and to transmit the requested information;

machine readable means for interpreting the machine readable markings on the selector sheet received by said CCITT modem means;

memory means for storing the information from which the requestor can select; and retrieval means under the control of said machine readable means for retrieving the information requested by the requesting party from said memory means and coupling the retrieved information to said CCITT modem means.

2. A FAX server apparatus as in claim 1 with said CCITT FAX transceiver having turnaround polling capability, wherein:

the combination of the operation times of said machine readable means and said retrieval means is sufficiently short so as to permit the analysis of the received selector sheet and the retrieval of the requested information to permit the transmission of a polling direction turnaround signal within the turnaround delay of said CCITT FAX transceiver to allow retrieval of the requested information during the telephone call initiated by the requestor via said CCITT FAX transceiver.

3. A FAX server apparatus as in claim 1 with said CCITT FAX transceiver containing a valid calling station identification number, said FAX server further comprising:

identification means coupled to said CCITT modem means for analyzing and converting the received calling station identification number into a valid local telephone number of said CCITT FAX transceiver, and for dialing said valid local telephone number for connecting said FAX server to said CCITT FAX transceiver to transmit the selected information to the requestor via the CCITT FAX transceiver from which the request was originally made during a second telephone call.

4. A FAX server apparatus as in claim 1 with said selector sheet containing spaces for the requestor to enter the telephone number of said CCITT FAX transceiver, said FAX server further comprising:

analysis means coupled to said machine readable means for converting said telephone number entered on said selector card into a valid local telephone number of said CCITT FAX transceiver, and coupled to said CCITT modem means for dialing said valid local telephone number for connecting said FAX server to said CCITT FAX transceiver to transmit the selected information to the requestor via the CCITT FAX transceiver from which the request was originally made during a second telephone call.

5. A FAX server apparatus as in claim 4 further comprises form generation means coupled to the CCITT modem means for generating a selector sheet that contains the telephone number of a calling CCITT FAX transceiver for transmission to said calling CCITT FAX transceiver.

6. A FAX server apparatus as in claim 1 with said CCITT FAX transceiver containing a unique digital identification number having a first field containing a digital value uniquely identifying the information to be retrieved, and a second field containing the telephone number of the FAX transceiver to which the requested information is to be transmitted, said FAX server further comprising:

decoding means coupled to said CCITT modem means for decoding the fields of said unique digital identification number and for dialing said valid local telephone number for connecting said FAX server to said CCITT FAX transceiver to transmit the selected information to the requestor via the CCITT FAX transceiver from which the request was originally made during a second telephone call, and coupled to said retrieval means to select from the memory means the information requested in the identification number.

7. A FAX server apparatus as in claim 1 further comprising:

communications means coupled to said machine readable means for accessing a remote computer based information system with the capability of creating information pages on-line data in response to the information request for transmission to the FAX transceiver.

8. A FAX server apparatus as in claim 1 wherein:

said memory means includes a data base organized in the form of pages of information; and said retrieval means has an up-date mode for adding or deleting pages of information to or from the memory means by sending a selector sheet having appropriate markings together with the pages of information that are to be added to or deleted from said data base.

9. A FAX server apparatus as in claim 1, wherein:

said CCITT modem means includes:

means for determining if said CCITT FAX transceiver is using turnaround polling, or has transmitted a usable calling station identification number; and said machine readable means includes:

means for decoding a telephone number of said CCITT FAX transceiver from said selector sheet if said CCITT modem means does not detect the existence of turnaround polling or a usable calling station identification number.

10. A FAX server apparatus as in claim 1 wherein said machine readable means is capable of reading:

one or more printed fields on said selector sheet that are to facilitate and constrain requestor markings to improve machine reading speed and accuracy.

11. A FAX server apparatus as in claim 10, wherein said machine readable means is capable of reading identifying symbols of the information requested from one or more of the fields on said selector sheet.

12. A FAX server apparatus as in claim 1 wherein said machine readable means is capable of reading at least a portion of a preprinted page containing an unique illustration as said selector sheet.

13. A FAX server apparatus as in claim 1 wherein said machine readable means can uniquely recognize a bar code label on said selector sheet.

14. A FAX server apparatus for providing requested portions of stored information to a selected CCITT FAX transceiver, said information being requested by means of a touch-tone telephone, said CCITT FAX transceiver and touch-tone telephone being connected to the FAX server via telephone lines, said FAX server comprising:

decoder means for decoding touch-tone signals received from the telephone line;

interpreter means coupled to the decoder means for converting said the touch-tone signals into commands that uniquely correspond to the requested information and;

memory means for storing the information from which the request can be made;

retrieval means under the control of said interpreter means for retrieving the information requested from said memory means; and CCITT modem means for communicating with said CCITT FAX transceiver to electronically transmit the requested information to the CCITT FAX transceiver.

15. A FAX server as in claim 14 wherein said interpreter means also converts said touch-tone signals that correspond to the telephone number of said CCITT FAX transceiver into a valid local telephone number of said CCITT FAX transceiver.

16. A FAX server as in claim 14 wherein;
said FAX server further comprises:
voice recognition means for interpreting voice sounds received from the telephone line and converting them into commands to allow the user to request selected portions of the stored information by voice transmission; and said retrieval means is further under the control of said voice recognition means for retrieving the information requested from said memory means.

17. A FAX server apparatus for providing requested portions of stored information to a selected CCITT FAX transceiver, said information being requested by means of a telephone, said FAX transceiver and telephone being connected to the FAX server via telephone lines, said FAX server comprising:
voice recognition means for interpreting voice sounds received from the telephone line and converting them into commands to allow the user to request selected portions of the stored information by voice transmission;

memory means for storing the information from which the request can be made;

retrieval means under the control of said voice recognition means for retrieving the information requested from said memory means; and CCITT modem means for communicating with said CCITT FAX transceiver to electronically transmit the requested information to the CCITT FAX transceiver.

18. A FAX server apparatus as in claim 17 wherein said FAX server further comprises:
ANI automatic number recognition means for extracting the telephone number of said CCITT FAX transceiver from the handshake signals received by the FAX server from the CCITT FAX transceiver; and translation means for translating the number received by the ANI automatic number recognition means into a valid local operative telephone number.

19. A method of information retrieval comprising the steps of:
a. marking a selector sheet to define the information requested;
b. transmitting the selector sheet of step a. via a CCITT FAX transceiver having a turnaround polling capability;
c. analyzing the selector sheet transmitted in step b. to determine the information requested;
d. transmitting a direction reversal signal to the CCITT FAX transceiver within the timing constraints window allowed by CCITT Recommendation T.30; and
e. transmitting the requested information to the FAX transceiver of step b.

* * * * *